United States Patent [19]

Yoshimura

[11] Patent Number: 5,194,548
[45] Date of Patent: Mar. 16, 1993

[54] ORGANIC NONLINEAR OPTICAL MATERIAL

[75] Inventor: Tetsuzo Yoshimura, Machida, Japan

[73] Assignee: Fujitsu Limited, Kanagawa, Japan

[21] Appl. No.: 470,477

[22] Filed: Jan. 26, 1990

[30] Foreign Application Priority Data

| Jan. 27, 1989 | [JP] | Japan | 1-016352 |
| Mar. 20, 1989 | [JP] | Japan | 1-066022 |
| Mar. 20, 1989 | [JP] | Japan | 1-066042 |
| Mar. 20, 1989 | [JP] | Japan | 1-066048 |

[51] Int. Cl.$^5$ ............ C08F 38/02; C08F 238/02
[52] U.S. Cl. ............ 526/285; 430/20; 526/310; 526/311; 526/312; 526/258; 359/241; 359/245; 359/280
[58] Field of Search ............ 526/285, 310, 311, 312, 526/258; 430/20

[56] References Cited

U.S. PATENT DOCUMENTS

| 4,615,962 | 10/1986 | Garito | 430/20 |
| 4,711,532 | 12/1987 | Choe | 350/354 |
| 4,748,273 | 5/1988 | Fukuda | 562/495 |
| 4,767,826 | 8/1988 | Liang | 525/421 |
| 4,772,421 | 9/1988 | Ikenaga | 252/500 |
| 4,781,443 | 11/1988 | Giles | 350/357 |

OTHER PUBLICATIONS

"An Exceptionally Large Linear Electro-Optic Effect in the Organic Solid MNA", Lipscomb et al, J. Chem. Phys., vol. 75, No. 3, Aug. 1, 1981, pp. 1509–1516.

"Organic Materials for Optical Second Harmonic Generation", Twieg et al, ACS Symposium Series 233, 1983, pp. 57–80.

"Optical Nonlinearities in One-Dimensional-Conjugated Polymer Crystals", Sauteret et al, Physical Review Letters, vol. 36, No. 16, Apr. 19, 1976, pp. 956–959.

*Primary Examiner*—Joseph L. Schofer
*Assistant Examiner*—Fred Zitomer
*Attorney, Agent, or Firm*—Armstrong, Nikaido, Marmelstein, Kubovcik & Murray

[57] ABSTRACT

Disclosed is an organic nonlinear optical material comprising a compound having a conjugate main chain in the molecule and having donor groups D and acceptor groups A added onto the conjugate main chain in the sequence of ..., D, D, A, A, D, D, ..., in which the distance between adjacent D's and the distance between adjacent A's are shorter than the distance between adjacent D and A with respect to the distance between the atoms on the main chain to which the respective groups are bonded.

In this organic nonlinear optical material, since electron wave functions are modified, enhanced quadratic and cubic nonlinear optical effects can be attained. Accordingly, the organic nonlinear optical material can be advantageously utilized for an electro-optical element and an optical-to-optical element.

33 Claims, 31 Drawing Sheets

- DONOR
- ACCEPTOR
- DIACETYLENE MONOMER

Fig.12A  Fig.12B  Fig.12C  Fig.12D

R: STERIC HINDRANCE
GROUP —◯
R': NON-STERIC HINDRANCE
GROUP —●

R: STERIC HINDRANCE
DONOR —▫
R': NON STERIC HINRANCE
ACCEPTOR —◁

R: n-TYPE GROUP —●
R': p-TYPE GROUP —●

R: n-TYPE DONOR —●
R': p-TYPE ACCEPTOR —◁

MONOMER 2
R: STERIC HINDRANCE
　ACCEPTOR —◁
R': NON-STERIC HINDRANCE
　DONOR —•

MONOMER 1
R: STERIC HINDRANCE
　DONOR —□
R': NON-STERIC HINDRANCE
　ACCEPTOR —◁

MONOMER 2
R: p-TYPE DONOR —○
R': n-TYPE ACCEPTOR —◀

MONOMER 1
R: n-TYPE DONOR —●
R': p-TYPE ACCEPTOR —◁

MONOMER 1
R: —•
R': —•
LARGE STERIC: —• & —•
HINDRANCE  —⊚ & —⊚

MONOMER 2
R: —⊚
R': —⊚
SMALL STERIC: —• & —⊚
HINDRANCE

MONOMER 1
R :DONOR —▫
R':DONOR —▫
MONOMER 3
R :ACCEPTOR —◀
R':ACCEPTOR —◀
LARGE STERIC: —▫&—◀ , —▫&—◀
HINDRANCE —▫&—▫ ; —◀&—◀
—▫&—▫ ,—◀&—◀

MONOMER 2
R :DONOR —▫
R':DONOR —▫
MONOMER 4
R :ACCEPTOR —◀
R':ACCEPTOR —◀
SMALL STERIC: —▫&—◀
HINDRANCE —▫&—▫
—◀&—◀
—◀&—▫

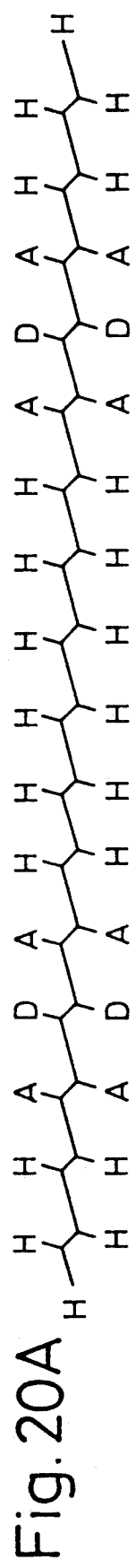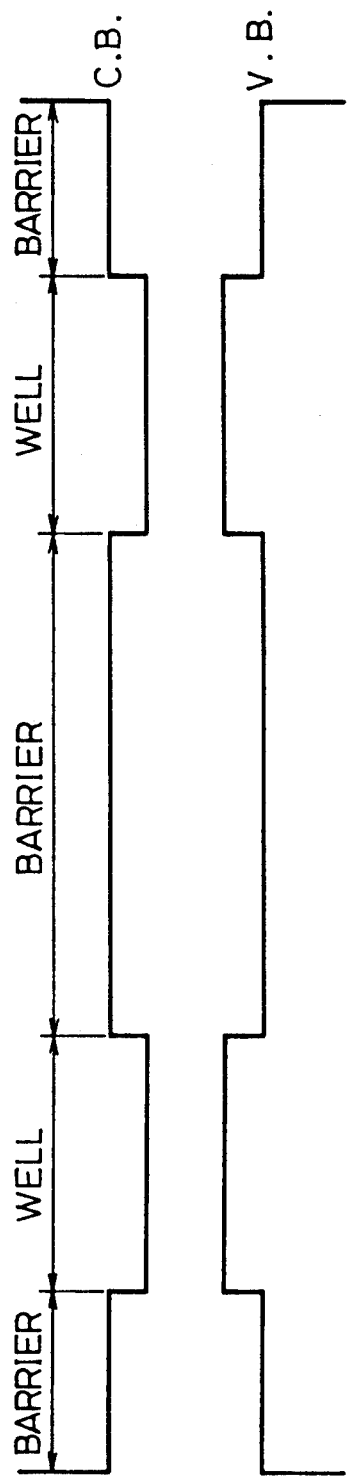
Fig.20A
Fig.20B

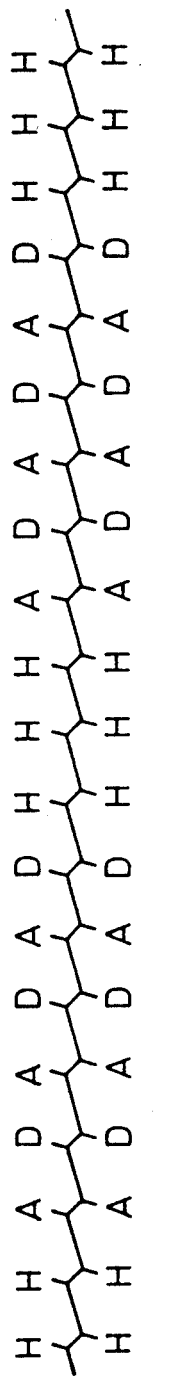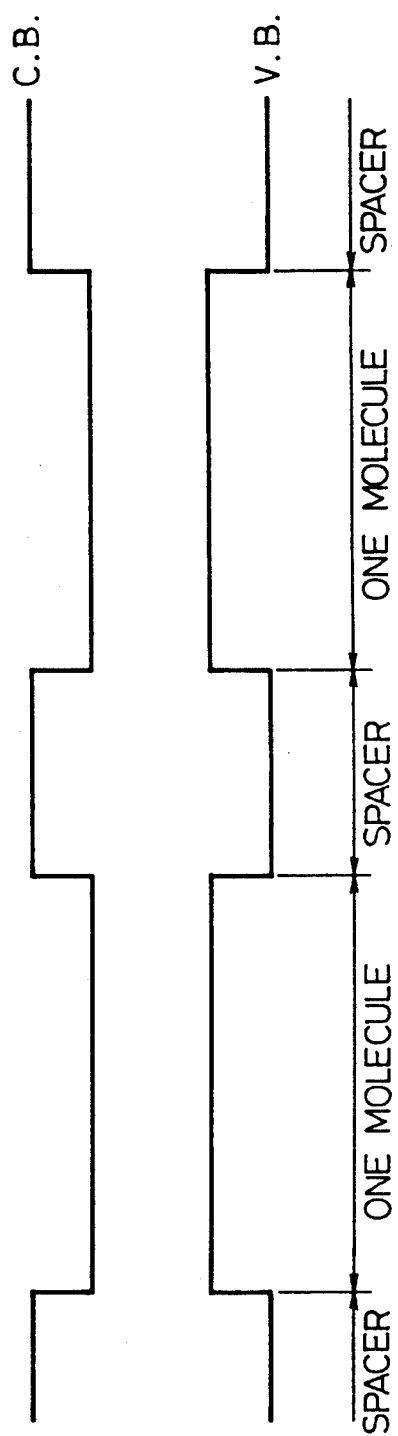
Fig. 24A
Fig. 24B

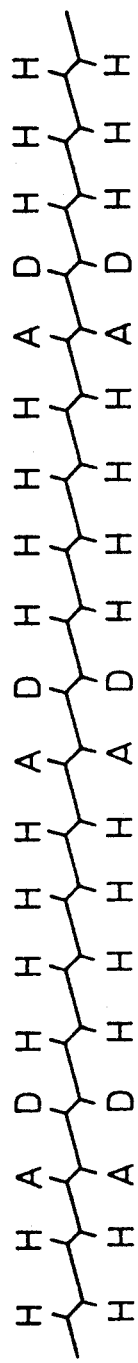
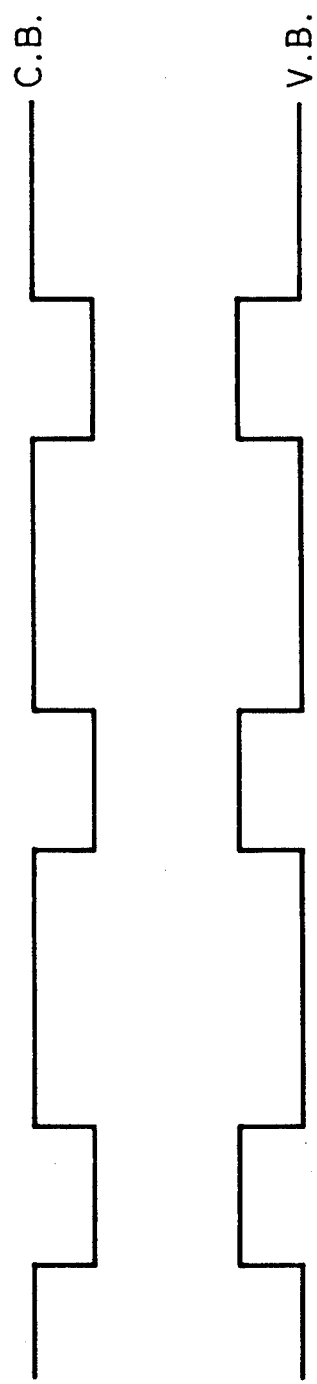
Fig. 26A
Fig. 26B

DONOR BLOCK

ACCEPTOR BLOCK

ACCEPTOR BLOCK

DONOR BLOCK

DONOR BLOCK

ACCEPTOR BLOCK

NEUTRAL BLOCK

POLYENE TYPE

POLYACENE TYPE

POLYPHENYL TYPE

ORGANIC NONLINEAR OPTICAL MATERIAL

BACKGROUND OF THE INVENTION

(1) Field of the Invention

The present invention relates to a nonlinear optical material, especially an organic nonlinear optical material. Furthermore, the present invention relates to an optical film or coating or optical dispersion composed of an organic nonlinear optical material and a process for the production thereof, and to an element or the like fabricated by using this organic nonlinear optical material. The organic nonlinear optical material or the like according to the present invention has excellent nonlinear optical characteristics, and therefore, can be used as a material for an electro-optical element, an optical-to-optical element and the like. Accordingly, the organic nonlinear optical material of the present invention can be advantageously utilized in the fields of the optical communication and computers.

(2) Description of the Related Art

As is well-known, a nonlinear optical material shows a second-order or third-order nonlinear optical effect under the application of a voltage or in a strong electric field of laser beams, and from the phenomen aspect, this material exerts many element functions such as optical frequency conversion, optical switching and optical amplification. Accordingly, the nonlinear optical material has attracted attention as a basic material in the fields of the optical communication and computers. Typical nonlinear optical materials heretofore developed are of the inorganic type, and crystals of $KD_2PO_4$ (KDP), $LiNbO_3$, $KNbO_3$ and $LiTaO_3$ are known. Since about 1983, development and research have been vigorously made into organic nonlinear optical materials, because it was found that organic nonlinear optical materials have superior characteristics to inorganic nonlinear optical materials. More specifically, for example, many organic nonlinear optical materials have a quadratic or second-order nonlinear optical constant more than 100 times as large as that of known inorganic crystals such as $LiNbO_3$ on the molecule level. Some of typical organic nonlinear optical materials are described below:

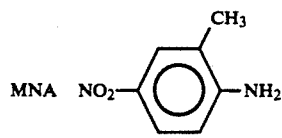

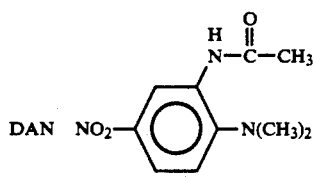

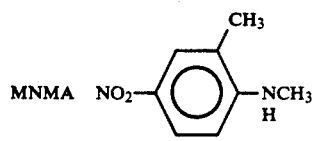

-continued

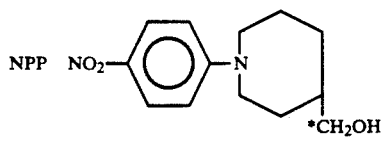

These organic nonlinear optical materials are introduced in detail, for example, in G. E. Lipscomb, A. F. Garito and R. S. Narang, J. Chem. Phys., Vol. 75, No. 3, 1509-1516 (1981) and Kanti Jain, "Organic Materials of Optical Second Harmonic Generator", ACS Symposium Series, 233, 57-80 (1983).

Although the above-mentioned organic materials have a larger nonlinear optical effect than the inorganic materials, there is still room for further improvements. For example, organic nonlinear optical materials fail to exert a nonlinear optical effect much higher than that of $LiNbO_3$ which is a typical inorganic electro-optical material. Polydiacetylene which is a cubic or third-order nonlinear optical material and is a polymer single crystal, as is well-known, that can be directly obtained from a monomer single crystal, can show a cubic nonlinear optical constant $\chi^{(3)}$ of $10^{-9}$ to $10^{-10}$, as shown in, for example, C. Sauteret, J. P. Hermann, R. Frey, F. Pradere, J. Ducing, R. H. Baughman and R. R. Chance, Phys. Rev. Lett., Vol. 36, No. 16, 956-959 (1976), but with this value, it is difficult to realize an optical-to-optical element using a laser diode (LD) as the light source. Under this background, development of an organic nonlinear optical material having larger quadratic and cubic nonlinear optical effects is desired.

Recently, an intensive study of the super lattice structure was made in the field of compound semiconductors, and the phenomenon of an increase of the nonlinear optical effect was found. The presently available super lattice is in the form of a laminate of faces, and although attempts have been made to expand this laminate to a quantum wire or quantum box and to search for new physical characteristics, these attempts have met with little success.

A material having a one-directional or one-dimensional conjugate chain, such as polydiacetylene, can be regarded as a quantum wire. Accordingly, it is expected that, if a quantum well is formed in this system, a quantum wire super lattice will be constructed and various physical properties represented by the nonlinear optical effect will be improved. Namely, the development of an organic super lattice, i.e., an organic nonlinear optical material having a quantum well structure, is desired.

It is known that the cubic nonlinear optical constant $\chi^{(3)}$ can be improved in a nonlinear optical film of a conjugate polymer in which a bound exciton is formed, i.e., a conjugate polymer in which a free exciton is converted to a trap exciton (see Fujitsu, Japanese Unexamined Patent Publication (Kokai) No. 62-270928. According to the technique of this patent publication, by utilizing the fact that the optical absorption spectrum is sharpened and the oscillator strength is increased if a free exciton is converted to a trap exciton, the nonlinear optical characteristics of a conjugate polymer, especially a one-dimensional conjugate polymer chain, are dramatically improved. According to this technique, since defects or impurities in the material are used as the binding centers, it is very difficult to introduce these defects into the material under artificial control. Therefore, it is desired that an improved organic nonlinear optical material having an exciton-trap center be provided.

Elements have been practically fabricated by using a polydiacetylene type long-chain conjugate molecule having a relatively large nonlinear optical effect. To fabricate such elements, however, it is generally necessary to add this long-chain conjugate molecule to a polymer such as poly(methyl methacrylate) (PMMA), and carry out a polling treatment for the formation of a film. In this dispersion system (the dispersion of the long-chain conjugate molecule in the polymer as the dispersion medium), the concentration of the added long-chain conjugate molecule, i.e., the nonlinear optical molecule, cannot be increased, and thus the nonlinear optical effect is reduced and 100% orientation of the long-chain conjugate molecule is difficult. Accordingly, the development of an organic nonlinear optical material, especially an organic nonlinear optical film, having a high concentration and a high orientation, is also desired.

SUMMARY OF THE INVENTION

A primary object of the present invention is to provide an organic nonlinear optical material having larger quadratic and cubic nonlinear optical effects.

A second object of the present invention is to provide an organic nonlinear optical material having excellent nonlinear optical characteristics and a quantum well structure.

A third object of the present invention is to provide an organic nonlinear optical material having an exciton-trap center which can be easily formed while properly controlled and having a high nonlinear optical effect.

A fourth object of the present invention is to provide an improved process for an organic nonlinear optical film, in which excellent quadratic and cubic effects are guaranteed. A process is known for preparing a super lattice polymer from a monomer capable of forming a conjugate polymer as the starting substance. According to this known process, a gasified monomer is blown onto a substrate, the monomer is irradiated with light to induce polymerization of the monomer, and an electric field is generated in the vicinity of the substrate, whereby the orientation characteristic of the monomer, and further, the orientation characteristic of the polymer chain are improved, and finally, the nonlinear optical characteristics are improved. This process, however, is defective in that a very strong electric field is necessary for the orientation of the electric field. The present invention is intended to provide a process in which this defect of the known process is overcome.

A fifth object of the present invention is to provide a high-concentration and high-orientation organic nonlinear optical material having larger quadratic and cubic nonlinear optical effects.

These and other objects will become apparent from the following description of preferred embodiments.

In accordance with one aspect of the present invention, the foregoing objects can be attained by an organic nonlinear optical material comprising a compound having a conjugate main chain in the molecule and having electron donative groups (donor groups) D and electron attractive groups (acceptor groups) A added onto the conjugate main chain in the sequence of ..., D, D, A, A, D, D, ..., in which the distance between adjacent D's and the distance between adjacent A's are shorter than the distance between an adjacent D and A with respect to the distance between the atoms on the main chain to which the respective groups are bonded.

In accordance with another aspect of the present invention, the foregoing objects can be attained by an organic nonlinear optical material comprising a compound having in the molecule a conjugate main chain, at a part of which a quantum well is formed, and having donor groups D and acceptor groups A added onto the conjugate main chain at the portion of the quantum well in the sequence of ..., D, D, A, A, D, D, ..., in which the distance between adjacent D's and the distance between adjacent A's are shorter than the distance between an adjacent D and A with respect to the distance between the atoms on the main chain to which the respective groups are bonded. The quantum well is formed by arranging a group different from the groups of other portion at a part of the conjugate main chain or by adding the groups of the same kind in a different arrangement.

In accordance with still another aspect of the present invention, the foregoing objects can be attained by an organic nonlinear optical material comprising a compound having in the molecule a conjugate main chain, at a part of which an exciton-trap center is formed, and having donor groups D and acceptor groups A added on the conjugate main chain at the portion of the binding center in the sequence of ..., D, D, A, A, D, A, ..., in which the distance between adjacent D's and the distance between adjacent A's are shorter than the distance between an adjacent D and A with respect to the distance between the atoms on the main chain to which the respective groups are bonded.

In accordance with a further aspect of the present invention, the foregoing objects can be attained by a process for preparing an organic nonlinear optical film composed of a long-chain molecule or polymer having a conjugate main chain in the molecule, which comprises depositing a molecule or monomer capable of forming said long-chain molecule or polymer on a substrate to form a film, wherein a molecule or monomer having a three-dimensionally expanded steric-hindrance type group and/or a one-dimensionally or two-dimensionally expanded non-steric-hindrance type group, added into the structure thereof, is used as said molecule or monomer, and a process as set forth above, wherein a molecule or monomer having an n-type group and/or a p-type group added into the structure thereof is used as said molecule or monomer.

In accordance with a further aspect of the present invention, the foregoing objects can be attained by an organic nonlinear optical material comprising a long-chain conjugate molecule or polymer having a conjugate main chain in the molecule, wherein at least two quantum wells are formed on the conjugate main chain, and an organic nonlinear optical material as set forth above, wherein long-chain conjugate molecules or polymers having a conjugate main chain in the molecule are connected to one another through another molecule different from said molecules or polymers in the energy gap.

In accordance with a further aspect of the present invention, the foregoing objects can be attained by an organic nonlinear optical material having in the molecule a conjugate main chain onto which a plurality of donor groups and acceptor groups are added, wherein the donor groups and acceptor groups are added in units of blocks, and an organic nonlinear optical material as set forth above, which comprises a neutral block free of the donor group and acceptor group in addition to a donor block consisting of a plurality of donor groups added onto the conjugate main chain and an acceptor block consisting of a plurality of acceptor groups added onto the conjugate main chain.

In accordance with a further aspect of the present invention, the foregoing objects can be attained by an organic nonlinear optical material comprising a compound having in the molecule a conjugate main chain onto which a donor group D and an acceptor group A are added, wherein at least two carbon atoms of the main chain are interposed between the carbon group of the main chain to which the donor group is added and the carbon atom of the main chain to which the acceptor group is added.

BRIEF DESCRIPTION OF THE DRAWINGS

FIGS. 12A through 12D are diagrams illustrating examples of the structure of a diacetylene monomer used in the process of the present invention.

Figures 22A, 22B:
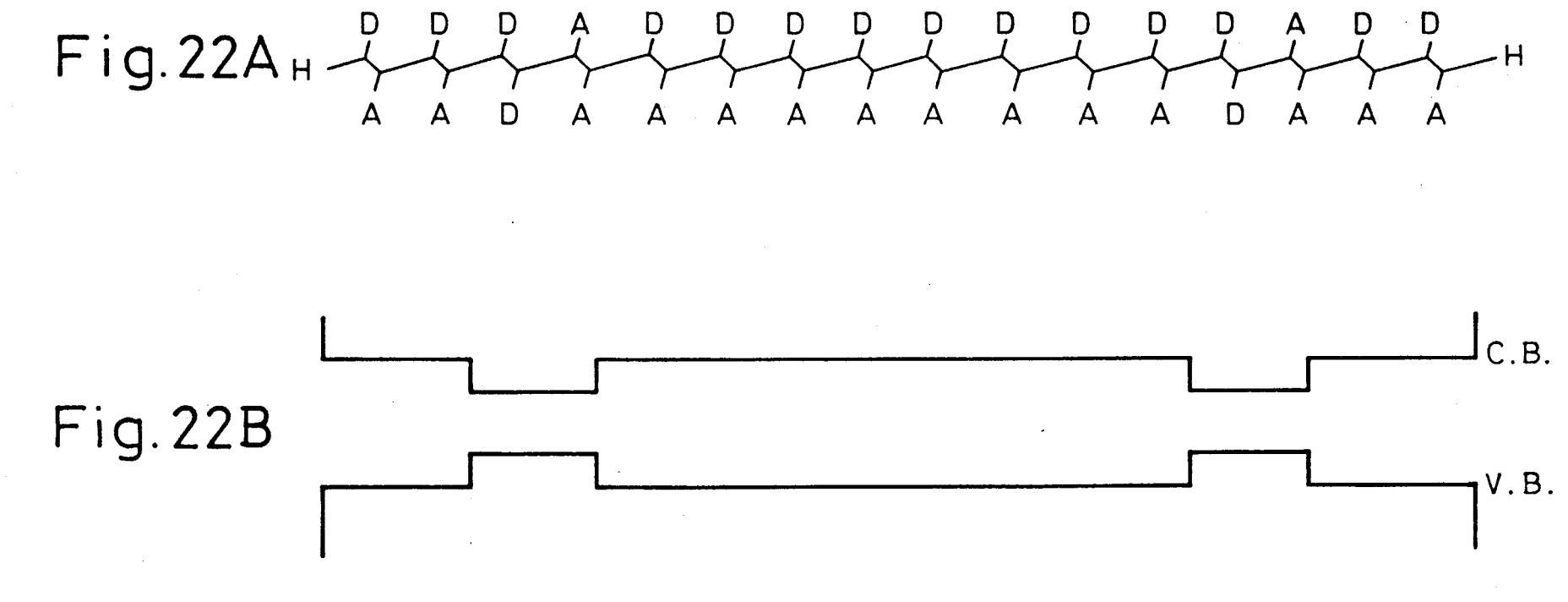

FIGS. 20 through 23 are diagrams illustrating the formation of a quantum well according to the present invention.

FIG. 24 is a diagram illustrating the connection of long-chain conjugate molecules according to the present invention.

FIGS. 25 and 26 are diagrams illustrating the periodical change of the band gap according to the present invention.

DESCRIPTION OF THE PREFERRED EMBODIMENTS

Figure 1:
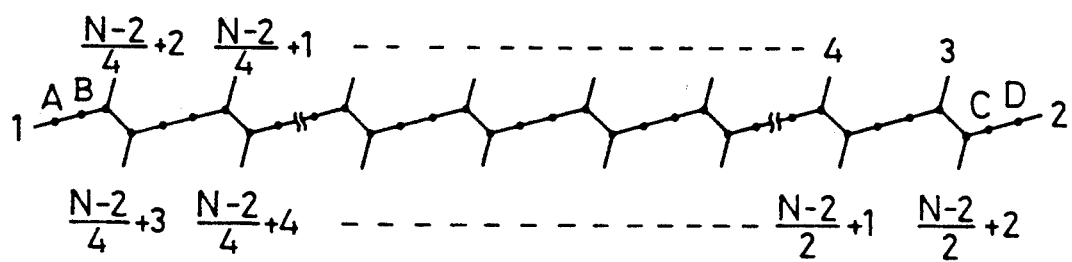
FIG. 1 is a diagram of a diacetylene type long-chain conjugate molecule according to the present invention.

As pointed out hereinbefore, the organic nonlinear optical material of the present invention comprises a compound having a conjugate main chain in the molecule and having electron donative groups (donor groups) D and electron attractive groups (acceptor groups) A added onto the conjugate main chain in the sequence of ..., D, D, A, A, D, D, ..., in which the distance between adjacent D's and the distance between adjacent A's are shorter than the distance between an adjacent D and A with respect to the distance between the atoms on the main chain to which the respective groups are bonded.

The organic compound constituting the organic nonlinear optical material of the present invention is not particularly critical, so long as the compound satisfies the above requirements, but a long-chain conjugate molecule or conjugate polymer such as a polyene type polymer, a polyphenyl type polymer or a diacetylene type polymer, especially a diacetylene type polymer, is advantageously used. In this long-chain conjugate molecule or conjugate polymer, terminal D and A of the added sequence of ..., D, D, A, A, D, D, ... may be the same or different. More specifically, where one end (initial end) is a donor group D, the other end (terminal end) may be a donor group D or acceptor group A, or in contrast, where one terminal is an acceptor group A, the other end may be a donor group D or acceptor group A.

Optical groups selected from the groups evaluated to be valuable in the art can be used as the donor group D and acceptor group A to be added onto the conjugate main chain. Preferred examples are shown in Table 1.

TABLE 1

| Donor Group D | Acceptor Group A |
| --- | --- |
| $-NH_2$ | $-NO_2$ |
| $-\bigcirc-NH_2$ | $-\bigcirc-NO_2$ |
| $-NMe_2$ | $-CN$ |
| $-\bigcirc-NMe_2$ | $-\bigcirc-CN$ |
| $-OCH_3$ | $-CF_3$ |
| $-\bigcirc-OCH_3$ | $-\bigcirc-CF_3$ |

TABLE 1-continued

| Donor Group D | Acceptor Group A |
|---|---|
| —C=C—OCH₃ | 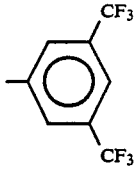 |
| —C=C—NH₂ <br> —C=C—NMe₂ | —C=C—NO₂ <br> —C=C—CN <br> —C=C—CF₃ |
| 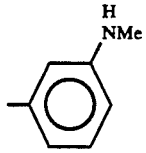 | —F |

Note
Me represents a methyl group.

The organic nonlinear optical material of the present invention can exist in various forms. For example, the optical material of the present invention can be an organic nonlinear optical film in one aspect. In this optical film, the above-mentioned long-chain conjugate molecules or conjugate polymers are contained in the state wherein they are periodically arranged.

According to the present invention, the organic nonlinear optical film can be prepared by a process comprising depositing a monomer capable of forming a conjugate polymer constituting the organic nonlinear optical material on a substrate and polymerizing the monomer under irradiation with light. In this film-forming process, preferably, the monomer is polymerized in the state where the monomer is oriented by an electric field. This film-forming process is carried out under various conditions, and preferably, the following conditions can be adopted for working this film-forming process.

(1) Vacuum is applied, and a film is formed by MBE (molecular beam epitaxy) or MBD (molecular beam deposition).

(2) The starting monomer is blown in the gaseous state to a substrate and deposited on the substrate, wherein the gaseous monomer used is derived from a starting powder in a K cell (Knudsen cell) or is introduced from the outside of a reaction chamber.

(3) The light applied for converting the monomer deposited on the substrate to a polymer is visible light or ultraviolet light.

(4) The light irradiation is carried out simultaneously with the blowing of the gaseous monomer or intermittently, or the light irradiation and the blowing of the gaseous monomer are carried out alternately.

(5) At the step of blowing the gaseous monomer to the substrate, a gas of a single monomer is supplied, or gases of a plurality of monomers are supplied simultaneously or alternately.

(6) After a film is formed from a monomer, a polymerization reaction of the monomer is caused by a photoreaction.

According to another aspect of the present invention, the organic nonlinear optical material can be an organic nonlinear optical dispersion of the organic nonlinear optical material dispersed in a medium. The medium for dispersing the organic nonlinear optical material in this optical dispersion is preferably a polymer such as poly(methyl methacrylate) or a glass such as quartz glass. In this nonlinear optical dispersion, preferably the molecule of the compound of the contained organic nonlinear optical material is oriented, and preferably this orientation is accomplished by polling.

According to the present invention, the organic nonlinear optical dispersion can be prepared by a process comprising simultaneously depositing a gaseous organic molecule capable of forming a compound constituting the organic nonlinear optical material and a gaseous molecule capable of forming the medium on a substrate to form a film.

This dispersion-forming process can be advantageously carried out in the same manner as the above-mentioned process for preparing the nonlinear optical film, but in this process, since it is intended to obtain a dispersion, some modifications will be made according to need.

As pointed out hereinbefore, the organic nonlinear optical material of the present invention comprises a compound having a conjugate main chain in the molecule, in which a specific quantum well is formed at a part of the conjugate main chain.

The organic nonlinear optical material having a quantum well structure according to the present invention can be the same as the above-mentioned organic nonlinear optical material, except that a quantum well is formed at a part of the conjugate main chain. Accordingly, this material can similarly take any of various forms such as the organic nonlinear optical film and organic nonlinear optical dispersion as mentioned above, and they can be prepared according to the above-mentioned processes.

Furthermore, as pointed out hereinbefore, the organic nonlinear optical material of the present invention comprises a compound having in the molecule a conjugate main chain, at a part of which an exciton-trap center is formed.

This organic nonlinear optical material having an exciton-binding center, as well as the above-mentioned organic nonlinear optical material having a quantum well structure, is the same as the above-mentioned organic nonlinear optical material except that an exciton-trap center is formed at a part of the conjugate main chain. Accordingly, this optical material can take any of various forms such as the organic nonlinear optical film and organic nonlinear optical dispersion, and they can be prepared according to the above-mentioned processes.

As is readily understood from the foregoing description, in the organic nonlinear optical material of the present invention, by adding donor groups D and acceptor groups at appropriate sites of a long-chain conjugate molecule or conjugate polymer, the wave function of electrons is modified to obtain larger nonlinear optical characteristics.

Furthermore, in the organic nonlinear optical material of the present invention, by adding groups different from groups of other portion or groups of a different arrangement (donor groups D and acceptor groups A) to a part of the conjugate main chain of the long-chain conjugate molecule or conjugate polymer, a quantum well is formed and improvement of the nonlinear optical characteristics is realized.

Moreover, in the organic nonlinear optical material of the present invention, by changing the sequence of groups (donor groups D and acceptor groups A) at a part of the conjugate main chain of the long-chain conjugate molecule or conjugate polymer, the level having an exciting energy smaller than that of the band gap is formed and is used as an exciton-trap center, whereby an improvement of the nonlinear optical characteristics is realized.

The organic nonlinear optical material of the present invention, for example, the optical material comprising a diacetylene type long-chain conjugate molecule, can be illustrated by the diagram of FIG. 1. In the diagram, each number represents the site of addition of the donor group D or acceptor group A. Accordingly, it will be understood that N in the diagram represents the number of carbon atoms constituting the conjugate main chain. As is generally adopted in the art, carbon atoms in the molecule are omitted but indicated by black dots (.).

The diacetylene type long-chain molecule shown in FIG. 1 can be any of the following four molecules according to the distribution of the donor groups D and acceptor groups A contained in the molecule.

Molecule 1

| Groups | Sites of Addition |
| --- | --- |
| hydrogen (H) | 1, 2 |
| donor group D | $3, 5, 7, \ldots, \frac{N-2}{4} + 1, \frac{N-2}{4} + 4,$ $\frac{N-2}{4} + 6, \ldots, \frac{N-2}{2} + 2$ |
| acceptor group A | $4, 6, \ldots, \frac{N-2}{4} + 2, \frac{N-2}{4} + 3,$ $\frac{N-2}{4} + 5, \frac{N-2}{4} + 7, \ldots, \frac{N-2}{2} + 1$ |

$\left[\frac{N-2}{4}\right]$: even number $N = 10 + 4 \times m (m = 0, 1, 2, \ldots)$ Molecule 2

| Groups | Sites of Addition |
| --- | --- |
| hydrogen (H) | 1, 2 |
| donor group D | $3, 5, 7, \ldots, \frac{N-2}{4} + 1, \frac{N-2}{4} + 4,$ $\frac{N-2}{4} + 6, \ldots, \frac{N-2}{2} + 2$ |
| acceptor group A | $4, 6, \ldots, \frac{N-2}{4} + 2, \frac{N-2}{4} + 3,$ $\frac{N-2}{4} + 5, \frac{N-2}{4} + 7, \ldots, \frac{N-2}{2} + 1$ |

$\left[\frac{N-2}{4}\right]$: odd number

Molecule 3

The molecule in which the donor groups D and acceptor groups A in molecule 1 are replaced with one another.

Molecule 4

The molecule in which the donor groups D and acceptor groups A in molecule 2 are replaced with one another.

As is easily understood, in each molecule, the $\pi$-conjugate system is slenderly expanded in the direction of the main chain, and the donor groups D and acceptor groups A are added in the sequence of ..., D, D, A, A, D, D, A, A, D, D, A, A, ..., whereby the wave function of electrons is modified. For example, in the case of molecules 1 and 3, the quadratic nonlinear molecule polarizability $\beta$ is scores of several ten times or more as large as that of MNA mentioned above. Furthermore, the cubic nonlinear molecule polarizability $\gamma$ is more than several times as large as the molecule to which donor groups and acceptor groups are not added. Since molecules 2 and 4 have an inversion symmetry, the quadratic nonlinear molecule polarizability $\beta$ is lost, but with respect to the cubic nonlinear molecule polarizability $\gamma$, molecules 2 and 4 show behaviors similar to those of molecules 1 and 3.

Figure 2:
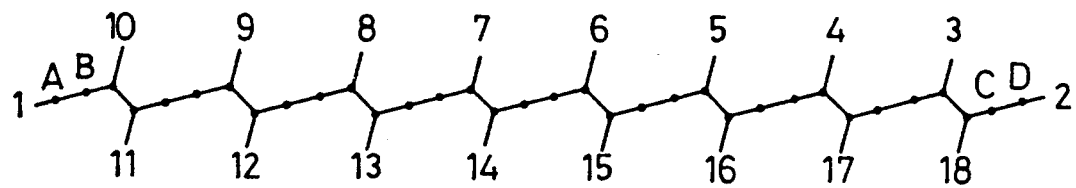
FIG. 2 is a diagram of the conjugate molecule shown in FIG. 1, in which the carbon number N is 34.

FIG. 2 is a diagram illustrating the molecule in which the number N of carbon atoms constituting the conjugate main chain, which is especially selected among molecules 1 mentioned above. In this molecule, the sites of addition of donor groups D and acceptor groups A are as follows.

| Groups | Sites of Addition |
| --- | --- |
| hydrogens (H) | 1, 2 |
| donor groups D | 3, 5, 7, 9, 12, 14, 16, 18 |
| acceptor groups A | 4, 6, 8, 10, 11, 13, 15, 17 |

In this molecule (N=34), the quadratic nonlinear molecule polarizability $\beta$ is 15 to 30 times as large as that of MNA, and the cubic nonlinear molecule polarizability $\gamma$ is about two times as large as that of the molecule free of groups D and groups A.

The donor group D and acceptor group A to be added into the diacetylene type long-chain conjugate molecule is not particularly critical, but the groups shown in Table 1 are preferably selected. Hydrogen atoms shown as the groups added at sites 1 and 2 in FIG. 1 and carbon atoms at sites A, B, C and D may be substituted with other atoms or groups weak in the electron donative or electron attractive property. As the atom or group suitable for the substitution, there can be mentioned, for example, —COOH and —COH. The number N of carbon atoms constituting the conjugate main chain is preferably at least 10.

FIGS. 1 and 2 show preferred examples of the molecular form to which the present invention can be applied, and it should be understood that the molecular form of the present invention is not limited to those shown in FIGS. 1 and 2, and even in case of a molecule or polymer having a very large number N of the constituent carbon atoms, similar effects can be attained if the donor groups D and acceptor groups A are arranged in the sequence of ..., D, D, A, A, D, D, A, A, ... in the molecule or polymer.

As pointed out hereinbefore, the organic nonlinear optical material of the present invention can take any of various forms such as an organic nonlinear optical film, an organic nonlinear optical dispersion and the like.

Figure 3:
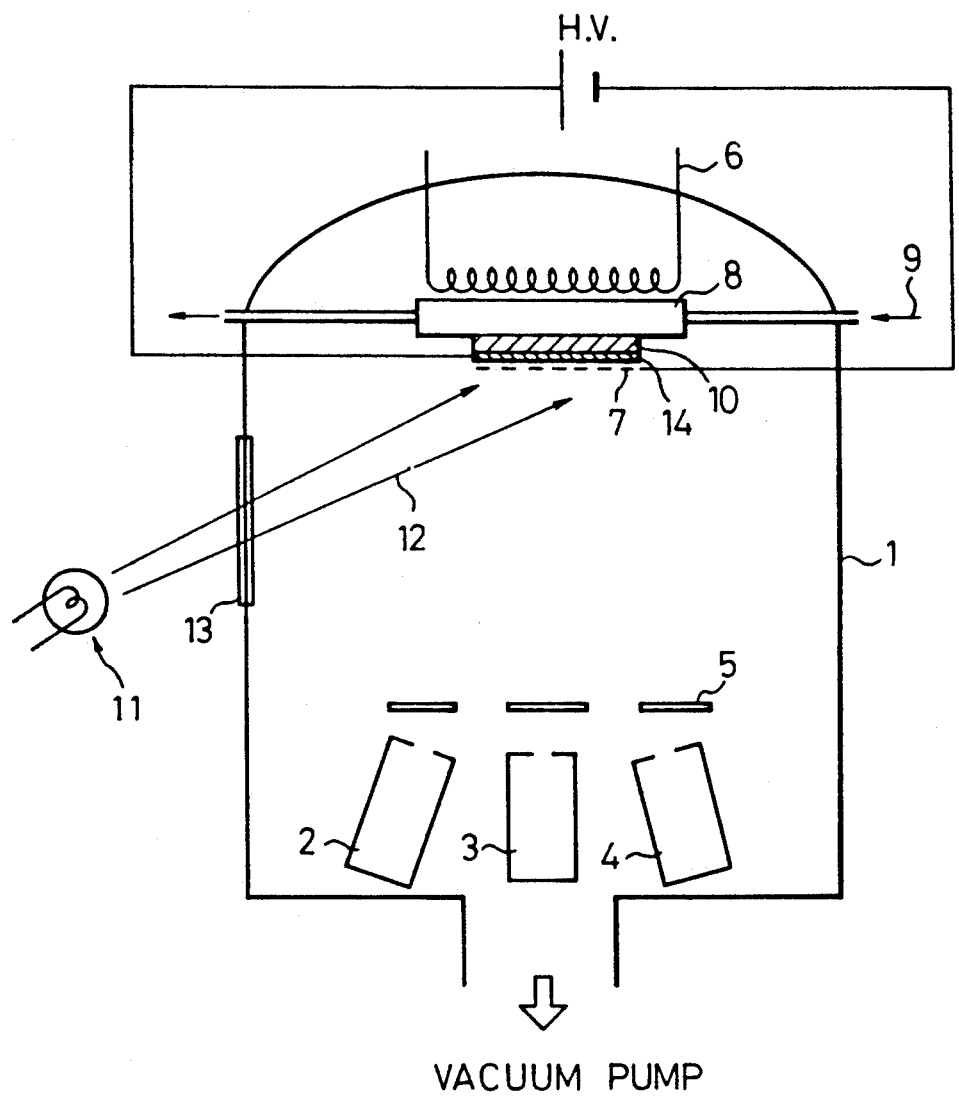
FIG. 3 is a sectional diagram illustrating an example of the organic film-forming apparatus for use in carrying out the present invention.

The organic nonlinear optical film can be formed, for example, by using an organic film-preparing apparatus as shown in FIG. 3. The apparatus shown in FIG. 3 is an MBE apparatus having a vacuum bell jar 1 as the reaction chamber. A substrate 10 in the vacuum bell jar 1 is, for example, a silicon substrate. This substrate 10 is supported by a substrate holder 8 and is heated or cooled to a predetermined temperature by a heating means or a cooling liquid or gas 9 passing through the interior of the holder 8. The cooling medium used may be cooling water, liquefied nitrogen or alcohol. A heater 6 is used in combination for adjusting the temperature of the substrate. This temperature adjustment effectively prevents condensation of the monomer. As shown in FIG. 3, an electrode is formed on the substrate 10 in advance, and another electrode (a grid 7 in this embodiment) is arranged on the front face of the substrate 10. A grid having a porous structure or network structure is advantageously used as the grid 7.

In the present invention, a monomer capable of forming a conjugate polymer is blown onto the substrate and irradiated with light to form an organic nonlinear optical film. Light 12 from a light source 11, for example, visible light or ultraviolet light, is used as the light for the irradiation. Reference numeral 13 represents a window. The light source 11 can be arranged in the vacuum bell jar 1 according to need. The monomer is contained within K cells 2, 3 and 4, and the monomer is evaporated and blown to the substrate while adjusting the feed rate by a shutter 5. In the embodiment shown in FIG. 3, the monomer is a solid monomer source stored in the K cell, but a gasified monomer source can be fed from a gas bomb or ampoule arranged outside the vacuum bell jar 1 according to need. The irradiation with light is carried out steadily or simultaneously with the blowing of the monomer to the substrate, or the irradiation with light is intermittently carried out. Furthermore, the blowing of the monomer and the irradiation with light can be conducted alternately, whereby the polymerization is accomplished more completely. Furthermore, the polymerization may be carried out with the application of light or heat, after the formation of a monomeric coating. Still further, a mixture or combination of monomers can be used, and if these monomers are simultaneously blown to the substrate, a copolymer can be obtained. If a plurality of monomers are blown to the substrate alternately, a super lattice of a one-dimensional polymer can be obtained. For preparing a diacetylene type long-chain conjugate molecule (polymer), starting monomers (diacetylene monomers) shown in Table 2 are advantageously used.

TABLE 2

General Structural Formula: R—C≡C—C≡C—R'

| R (donor group) | R'(acceptor group) |
|---|---|
| —NH₂ | —NO₂ |

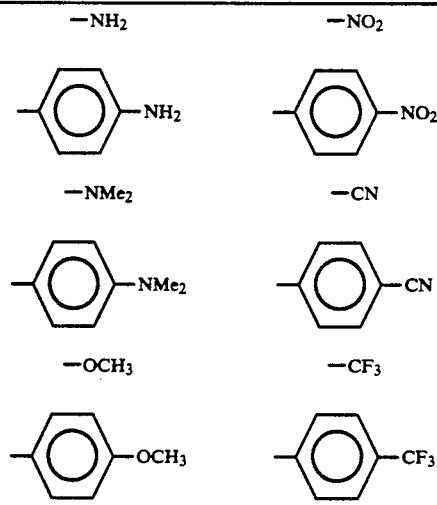

TABLE 2-continued

General Structural Formula: R—C≡C—C≡C—R'

| R (donor group) | R'(acceptor group) |
|---|---|

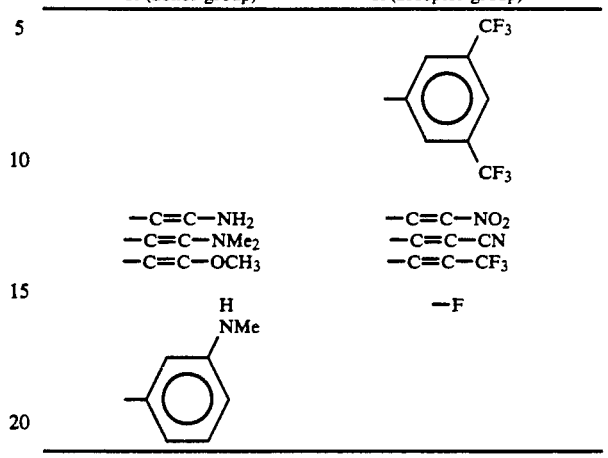

| —C=C—NH₂ | —C=C—NO₂ |
| —C=C—NMe₂ | —C=C—CN |
| —C=C—OCH₃ | —C=C—CF₃ |

Note
Me represents a methyl group.

A nonlinear optical film is prepared in the following manner by using the organic film-preparing apparatus shown in FIG. 3. The distance between an electroconductive layer (electrode) 14 formed on the substrate 10 and a confronting grid 7 arranged on the substrate is adjusted to about 10 μm to 5 mm. If this distance is of the order of 10 μm, a spacer such as a fiber ball is necessary. A predetermined voltage, generally a voltage of about 100 V to about 10 KV, is applied between the electroconductive layer 14 and grid 7, whereby bipolar moments of molecules (for example, molecules of diacetylene monomers shown in Table 2) flying from the K cells 2, 3 and 4 are oriented in the film thickness direction on the substrate or in the vicinity of the substrate.

If the monomer molecules oriented in the film thickness direction are irradiated with light (for example, ultraviolet light) 12 from the light source 11, bonds are formed among the monomer molecules on the substrate to cause the polymerization reaction and grow the conjugate main chain of the diacetylene, whereby a desired nonlinear optical film is obtained.

Figure 4A:
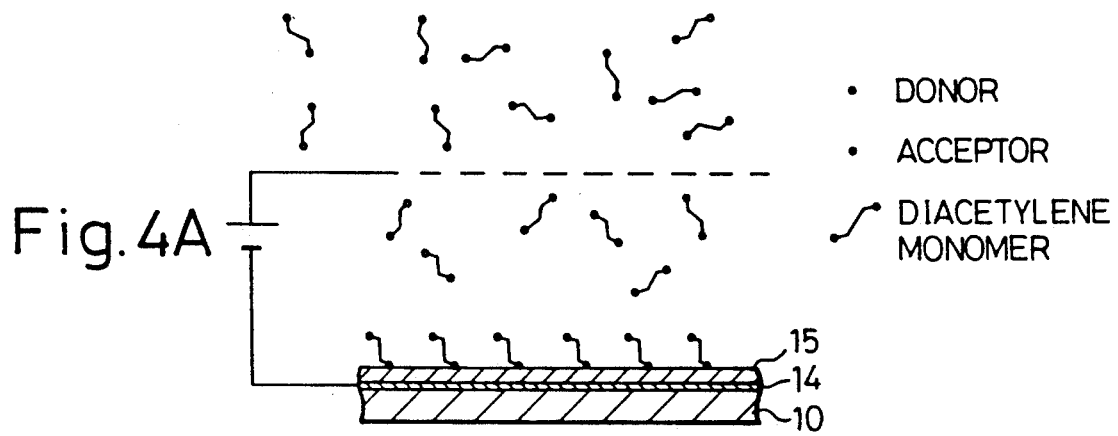
FIGS. 4A through 4C are sectional views showing the structure of the film in sequence at the film-forming process using the apparatus shown in FIG. 3.
Figure 4B:
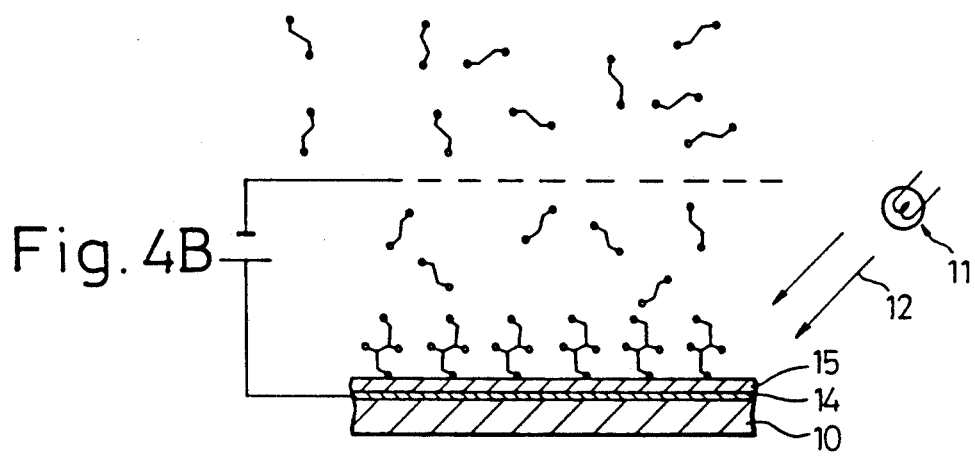
Figure 4C:
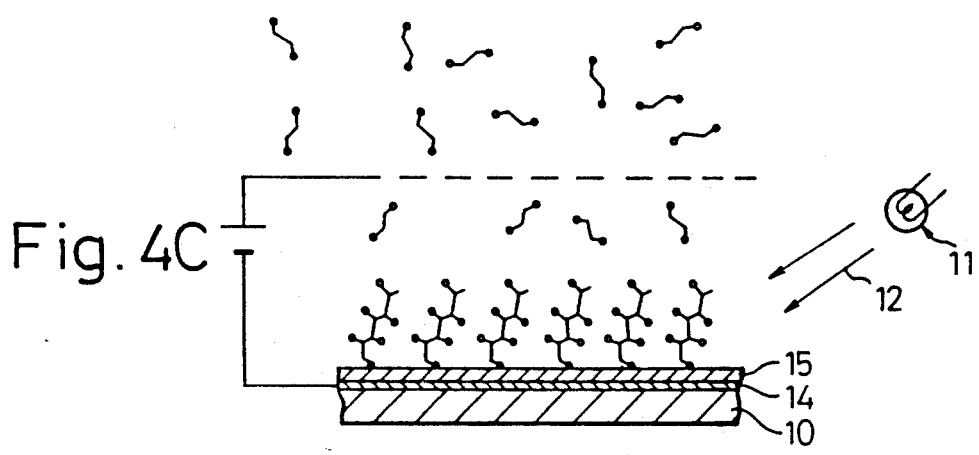

According to the above-mentioned process, by generating an electric field in the vicinity of the substrate, the orientation characteristic of the monomer and further, the orientation characteristic of the polymer chain can be improved, and consequently, the nonlinear optical characteristics can be improved. The above-mentioned process is especially suitable for controlling the arrangement of donor groups D and acceptor groups A in the polymer. For example, as diagrammatically illustrated in FIGS. 4A through 4C (in which reference numeral 10 represents the substrate, reference numeral 14 represents an electroconductive layer, that is, an electrode, and reference numeral 15 represents a buffer layer), if a film is prepared by reversing the polarity of the voltage at the steps 4A, 4B and 4C, the orientation direction of the monomer is reversed, and donors and acceptors are arranged in the sequence of . . . , donor, acceptor, acceptor, donor, donor, . . . , whereby the desired sequence of . . . , D, D, A, A, D, D, . . . can be obtained.

If several monomers are laminated and an insulating layer is then inserted, a quantum well of the conjugate one-dimensional polymer molecule can be formed.

Figure 5:
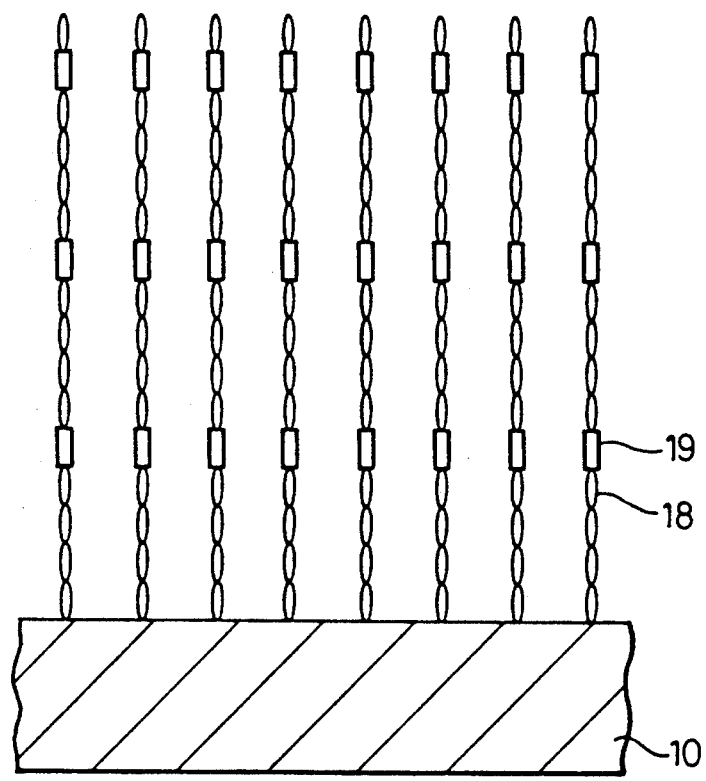
FIG. 5 is a diagram illustrating an example of the formation of a quantum well in a conjugate one-dimensional polymer molecule.

More specifically, as shown in FIG. 5, several conjugate molecules or conjugate molecule chains 18 are arranged on the substrate 10 and then, an insulating or non-electron-conductive molecule 19 is arranged. This operation is repeated to form a film. The insulating layer between the molecules is not absolutely necessary, and the direction of the long axis of the molecule chain need not be vertical to the substrate but may be inclined thereto. Furthermore, if the surface of the substrate is subjected to a hydrophobic treatment, a hydrophilic treatment or a rubbing treatment or if a p-type or n-type semiconductor is used for the substrate or a substrate on which an oriented film used for a liquid display is formed is used, the state of the adsorption of the monomer on the substrate or the angle between the substrate and the long axis of the monomer molecule can be adjusted.

The organic nonlinear optical dispersion can be prepared in the same manner as described above with respect to the organic nonlinear optical film. More specifically, by using the apparatus shown in FIG. 3, the flying long-chain molecule or monomer is oriented by an electric field generated in the vicinity of the substrate, and simultaneously, a substance capable of forming a polymer, such as MMA (methyl methacrylate), or a glass-forming substance such as $SiO_x$ is blown onto the substrate, whereby a film-shaped oriented dispersion system can be prepared. According to another process, the long-chain conjugate molecule of the present invention can be used in the state dispersed in a polymer or glass. In this case, a sufficiently large value of the cubic nonlinear electric susceptibility $\chi^{(3)}$ can be obtained only if the long-chain conjugate molecule is dispersed, but in order to obtain a large value of $\chi^{(2)}$, it is necessary to impart an inversion symmetry. The polling treatment is effective for this purpose.

Figure 6:
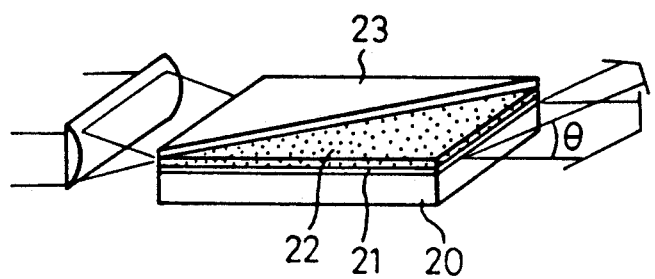
FIG. 6 is a perspective view illustrating an example of the use of a nonlinear optical film of the present invention in a deflector or optical deflecting system.
Figure 7:
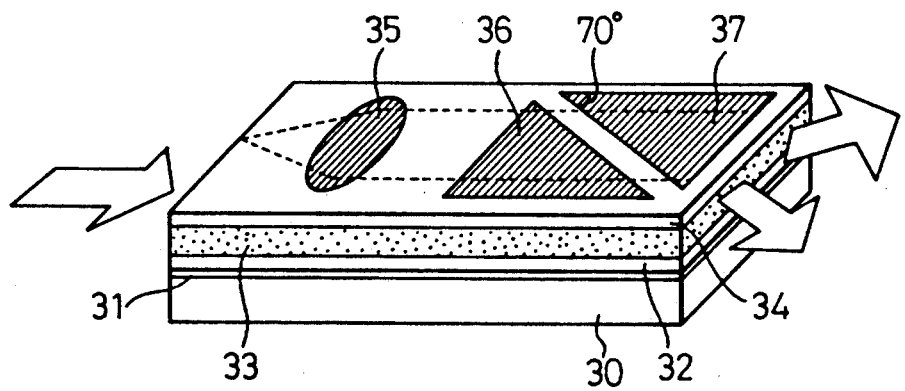
FIG. 7 is a perspective view showing an example of the use of a nonlinear optical film of the present invention in a deflector.

The nonlinear optical film of the present invention can be advantageously used for the production of various optical devices. For example, a deflector or light deflecting device as shown in FIG. 6 can be prepared by forming an electrode on the surface of the obtained nonlinear optical film. In FIG. 6, reference numeral 20 represents a substrate, and a lower electrode 21, a nonlinear optical film 22 and an upper electrode 23 are laminated in sequence on the substrate 10. Furthermore, a deflector as shown in FIG. 7 can be fabricated in accordance with the similar manner. In FIG. 7, reference numeral 30 represents a substrate, and a counter electrode 31, a buffer layer 32, an organic nonlinear waveguide 33 having a thickness of 5 μm and a buffer layer 34 are laminated in sequence on the substrate 30. A waveguide lens electrode 35 and waveguide prism electrodes 36 and 37 are formed on the buffer layer 34. If a voltage is selectively applied to the waveguide, the refractive index is changed at the voltage-applied site. Accordingly, the direction of light can be scanned by applying a voltage in a prism pattern, and further, light can be changed to substantially parallel rays by applying a voltage in a lens pattern. Moreover, multifunctional optical integral circuits (ICs) capable of various optical control can be provided, if the electrode is fabricated into different forms such as a diffraction grating, a spherical element and the like.

Moreover, the nonlinear optical film of the present invention can be advantageously used for the manufacture of a steric electro-optical element. Examples of the use of the nonlinear optical film in electro-optical elements are shown in FIGS. 8 and 9.

Figure 8:
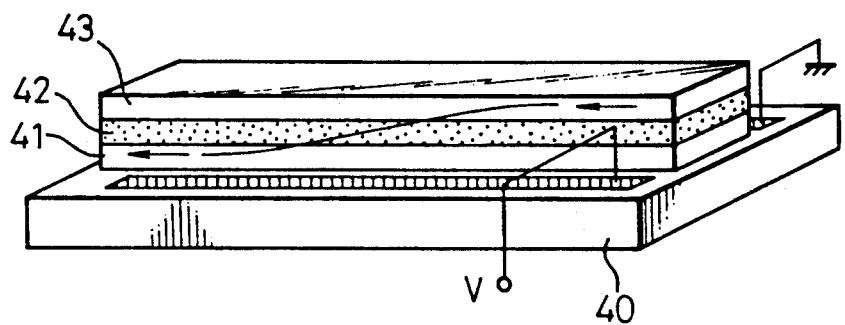
FIG. 8 is a perspective view showing an example of the use of a nonlinear optical film of the present invention in a longitudinal directional coupler.

FIG. 8 shows an example of the use of the organic nonlinear optical waveguide of the present invention in a longitudinal directional coupler. As shown in FIG. 8, a substrate 40 has a three-stage laminated waveguide comprising a lower waveguide 41, an organic nonlinear optical waveguide 42 and an upper waveguide 43. In this construction, light can be moved and changed over among the layers. More specifically, in this element, the refractive index of the intermediate nonlinear waveguide 42 is changed by application of a voltage, whereby the changeover of light can be performed between the upper and lower waveguides 41 and 43.

Figure 9:
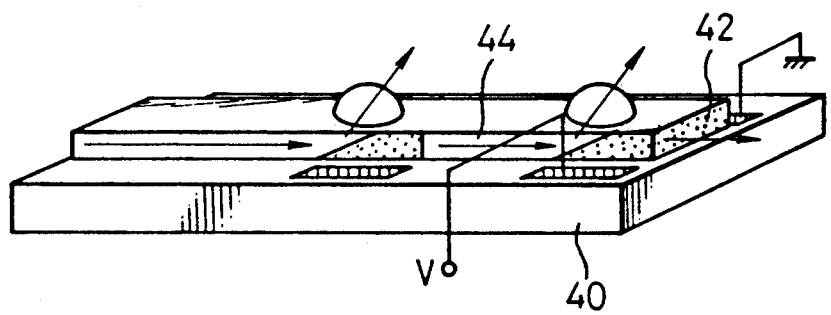
FIG. 9 is a perspective view showing an example of the use of a nonlinear optical film of the present invention in a longitudinal light switch modulator.

FIG. 9 shows an example of the use of the organic nonlinear optical waveguide of the present invention in a longitudinal light switch modulator. As shown in FIG. 9, in this element, the interface between a nonlinear waveguide 42 and a linear waveguide 44 is inclined to the plane of a substrate 40. In this element, the refractive index of the nonlinear portion is electrically changed to control the reflectance in the vicinity of the interface, whereby the changeover of optical paths can be accomplished and a modulator or switch can be three-dimensionally constructed. Furthermore, by arranging a microlens in a light-emitting portion of the waveguide as shown in FIG. 9, dissipation of light can be reduced.

Figure 10A:
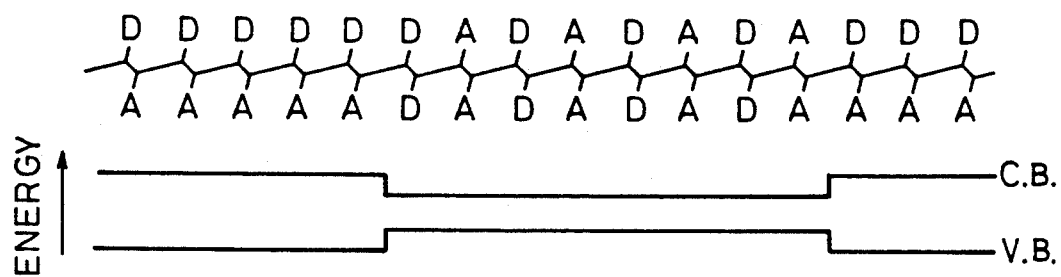
FIGS. 10A through 10C are diagrams illustrating an example of the preparation of a one-dimensional quantum well according to the present invention.

The organic nonlinear optical material having a quantum well according to the present invention can have, for example, a quantum well structure as shown in FIG. 10A. FIG. 10A diagrammatically illustrates a polydiacetylene type one-directional conjugate chain in which groups (donor groups D and acceptor groups A) are added in an arrangement different from that in other portion to form a quantum well. Where groups are added in the sequence of . . . , D, D, A, A, D, D, A, A, D, D, A, A, . . . so that the distance between adjacent D's and the distance between adjacent A's are shorter than the distance between adjacent D and A, the band gap is narrower than in the case where groups are added in the sequence of . . . , D, A, D, A, D, A, D, A, . . . and therefore, a quantum well as shown in FIG. 9 is formed. Note, in the illustrated band diagram, V.B. means the valence band and C.B. means the conduction band.

Figure 10B:
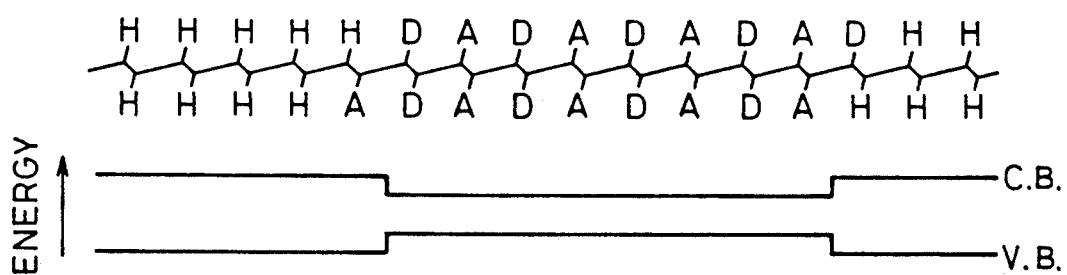

The organic nonlinear optical material of the present invention can also have a quantum well structure as shown in FIG. 10B. Namely, FIG. 10B diagrammatically illustrates an embodiment in which groups different from those of other portions are added to form a quantum well. In this embodiment, since the donor groups D and acceptor groups A are added in the sequence of A, D, D, A, A, . . . , D, D, A, A, D, the band gap becomes narrow and furthermore, it has been confirmed that the quadratic and cubic nonlinear optical effects are increased.

Figure 10C:
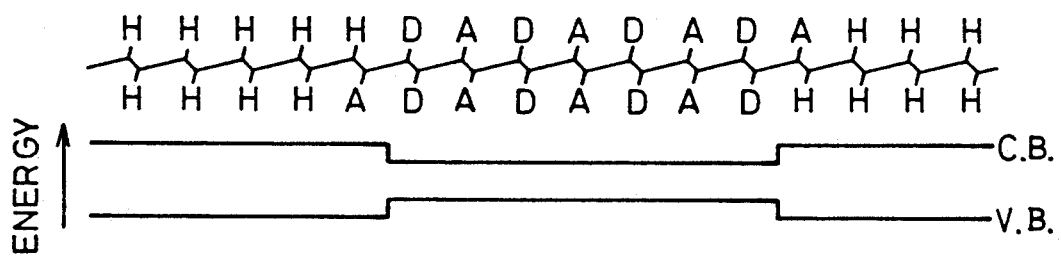

Furthermore, the organic nonlinear optical material of the present invention can have a quantum well structure having an inversion symmetry, as shown in FIG. 10C. In this embodiment, as shown in FIG. 10C, the donor groups D and acceptor groups A are added in the sequence of A, D, D, A, A, D, D, . . . , D, D, A, A, D, D, A. Accordingly, in this embodiment, the quadratic nonlinear optical effect is not manifested, but the cubic nonlinear optical effect is as large as in the above-mentioned embodiment shown in FIG. 10B.

As apparent from the above, according to the present invention, the nonlinear optical effect of the single quantum well per se can be increased, and if such wells are formed periodically and repeatedly to form an MQW structure (multiple quantum well structure), a much better nonlinear optical film can be realized. Furthermore, even if the nonlinear optical effect of the well per se is small, by forming the MQW structure, the cubic nonlinear optical characteristics can be increased.

The organic nonlinear optical materials having a quantum well structure as explained with reference to FIGS. 10A through 10C can be advantageously prepared, for example, according to the electric field orientation process described hereinbefore with reference to FIGS. 3 and 4. For example, the structure shown in FIG. 10A can be realized by blowing a monomer molecule having a structural formula of D-C≡C-C≡C-A to the substrate while keeping the electric field constant in the vicinity of the substrate. Namely, the donor groups D and acceptor groups A are arranged in the sequence of D, A, D, A, D, A, . . . to form a film. For the formation of a well layer, every time one monomer flies and participates in the formation of the film, the direction of the electric field is inverted and also the direction of the monomers is inverted. Accordingly, the groups can be added in the sequence of D, A, A, D, D, A, A, . . . , D, D, A. Also in case of the structures shown in FIGS. 10B and 10C, well layers can be formed in the same manner as described above. For the formation of the barrier layer, an electric field is not particularly applied, and a monomer H-C≡C-C≡C-H is stacked. Note, the description has been made with reference to the polydiacetylene type conjugate chain, but it should be understood that the present invention is effective to not only this conjugate chain but also all of conjugate chain-forming structures such as polyene type and polyphenyl type structures.

Figure 11A:
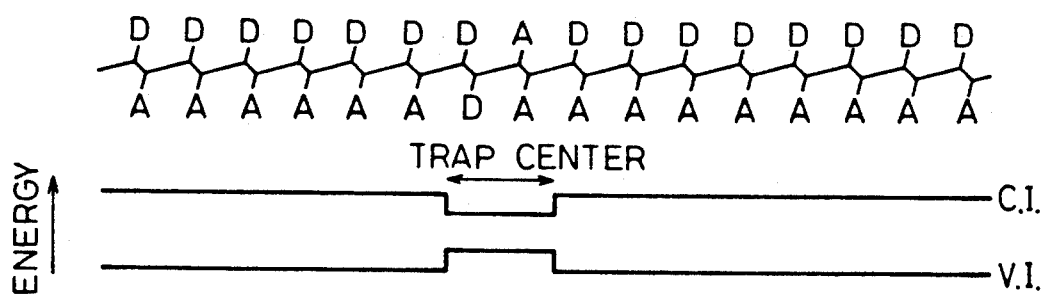
FIGS. 11A and 11B are diagrams illustrating an example of a trap center of exciton according to the present invention.

The organic nonlinear optical material having an exciton-trap center according to the present invention can have, for example, a structure as shown in FIG. 11A. FIG. 11A diagrammatically illustrates a polydiacetylene one-dimensional conjugate conjugate chain in which groups (donor groups D and acceptor groups A) are added in an arrangement different from the arrangement of other portion to form a trap center. If the groups are added in the sequence of . . . , D, D, A, A, D, D, A, A, . . . , the exciting energy is lower than where the groups are added in the sequence of . . . , D, A, D, A, D, A, . . . , and therefore, if the arrangement of D, D, A, A is included, an indentation of the potential is formed as shown in FIG. 11A. In short, an exciton-trap center can be formed only by changing the sites of the groups D and A.

Figure 11B:
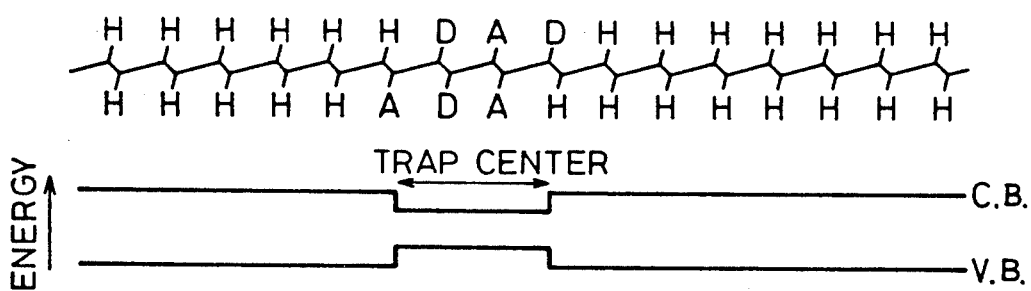

FIG. 11B shows a partial modification of the embodiment shown in FIG. 11A. It will be understood that a trap center can be formed by inclusion of the arrangement of A, D, D, A, A, D. Further, the excitor may be shut in, if the number of D and A is increased to increase the width of the quantum well to about several times or ten times of the radius of excitor.

The structures shown in FIGS. 11A and 11B can be realized by the electric field orientation process described hereinbefore with reference to FIGS. 3 and 4. For example, in case of the structure shown in FIG. 11A, a monomer molecule having a structural formula of D-C≡C-C≡C-A is blown onto the substrate while keeping the electric field constant in the vicinity of the substrate, whereby a film is formed while the groups D and A are arranged in the sequence of D, A, D, A, D, A, . . . . For the formation of the trap center, every time one monomer flies and participates in the formation of the film, the direction of the electric field is inverted and the direction of the monomers is inverted. As the result, the groups can be added in the sequence of D, A, A, D, D, A, A, . . . , D, D, A. Also in case of the structure shown in FIG. 11A, a binding center can be formed in the same manner as described above. For the formation of the skeleton portion, an electric field is not particularly applied, but the monomer H-C≡C-C≡C-H is stacked. Note, the present invention is effective to not only the above-mentioned polydiacetylene type conjugated chain but also other structures forming a conjugate chain such as a polyene type or polyphenyl type conjugate chain. This holds good also with respect to embodiments described hereinafter.

As apparent from the foregoing description, the organic nonlinear optical material of the present invention has a much higher nonlinear optical effect than the conventional materials. Accordingly, if this optical material is applied to an electro-optical element or an optical-to-optical element, the device characteristics can be improved. In the material of the present invention, the light absorption band tends to greatly shift toward the low energy side because of the electron-donative effect and electron-attractive effect. This means that when light of a long wavelength band is used, the resonant effect becomes conspicuous and the nonlinear optical effect is further increased.

Moreover, according to the present invention, it becomes possible to prepare an organic one-dimensional quantum well, and the nonlinear optical characteristics can be improved by forming a one-dimensional quantum well or multiple quantum well structure.

Still further, according to the present invention, an exciton trap center can be easily formed in the polymer conjugate chain with a good controllability, or a quantum well can be shut-in within a one-dimensional system of the exciton.

Research was made with a view to providing an improved process for preparing an organic nonlinear optical membrane, and as a result it was found that, if appropriate groups are added to a molecule or monomer capable of forming a long-chain molecule or polymer constituting an organic nonlinear optical film, the steric hindrance can be controlled and the adsorptive force between the molecules owing to the electron-donative and electron-attractive properties can be controlled, with the result that the easiness of bonding between the monomers can be controlled and hence, the control of orientation deposition of molecules, especially deposition of units of one molecule, becomes possible, whereby the intended object can be attained. The film-forming process used in the present invention is called "MLE" (molecular layer epitaxy).

More specifically, in accordance with one aspect of the present invention, there is provided a process for the preparation of an organic nonlinear optical film composed of a long-chain molecule or polymer having a conjugate main chain in the molecule, which comprises depositing a monomer capable of forming said long-chain molecule or polymer on a substrate, wherein a molecule or monomer having at least one steric-hindrance type group added into the structure thereof is used as said molecule or monomer. By the steric-hindrance type group is meant a three-dimensionally expanded large group making a hindrance to the bonding among the molecules or monomers (hereinafter referred to as "large group"). In contrast, by the nonsteric-hindrance type group is meant a one-dimensionally or two-dimensionally expanded small group making no hindrance to the bonding among the molecules or monomers (hereinafter referred to as "small group"). In the instant specification, the molecule or monomer capable of forming a long-chain molecule or polymer is generally called "monomer", and the present invention will now be described in detail with reference to diacetylene monomer R-C≡C-C≡C-R' (in which R and R' represent a substituent), which is a typical instance of the monomer.

It was found that the monomer used preferably has two sites to which the above-mentioned appropriate group can be added, and a steric-hindrance type group is added to one of these sites and a non-steric-hindrance type group is added to the other site.

One of the steric-hindrance type group and non-steric-hindrance type group can have an electron-donative property and the other can have an electron-acceptive property. For example, in the process of the present invention, there can be used a monomer in which a steric-hindrance type donor group is added to one site and a non-steric-hindrance type acceptor group is added to another site, and a monomer in which a steric-hindrance type acceptor group is added to one site and a non-steric-hindrance type donor group is added to another site.

Furthermore, the steric-hindrance type group and non-steric-hindrance type group can be present in one monomer structure, as mentioned above, or they can be present in different monomer structures and the donor group and acceptor group can be combined, as mentioned above. If a film is prepared by using at least two kinds of such monomers in combination, the effect of the present invention can be diversified.

In accordance with another aspect of the present invention, there can be provided a process characterized in that a monomer in which at least one of a group having a large electronegativity and an electron-acceptive property (hereinafter referred to as "p-type group") and a group having a small electronegativity and an electron-donative property (hereinafter referred to as "n-type group") is added into the structure is used as the monomer. In this embodiment, preferably the portions manifesting the electron-acceptive property and electron-donative property are cut from the inherent conjugate π-electron system of the monomer. More specifically, in the monomer structure, a group having an electron-acceptive portion in the state cut from the conjugate π-electron system in the monomer (the state where at least two continuous single bonds are contained between the monomer proper and this group), that is, the p-type group, and/or a group having an electron-donative portion in the state cut from the conjugate π-electron system in the monomer (the state where at least two continuous single bonds are contained between the monomer proper and this group), i.e., the n-type group, are added.

The monomer used in this embodiment is preferably a monomer having at least two sites to which p-type and n-type groups as mentioned above can be added, in which the p-type group is added to one of such sites and the n-type group is added to the other site. One of the p-type and n-type groups can have an electron-donative property and the other group can have an electron-acceptive property. For example, a monomer having a p-type donor group and an n-type acceptor group or a monomer having a p-type acceptor group and an n-type donor group can be used for the formation of a film.

The above-mentioned two contrary groups may be present not only in one monomer structure, as mentioned above, but also in different monomer structure. Moreover, at least two kinds of such monomers can be used in combination for the formation of a film.

In accordance with still another aspect of the present invention, there is provided a process characterized in that at least two kinds of monomers having properties such that the bonding of first monomers is impossible because of the steric hindrance of the group added to the monomer, the bonding of second monomers is impossible because of the steric hindrance of the group added to the monomer, but the steric hindrance is moderated between the first and second monomers is moderated and bonding of the first and second monomers is possible, are used as the monomer.

As in the above-mentioned embodiments, a donor group or an acceptor group can be introduced into the first and second monomers. These monomers are optionally combined and used for the formation of a film.

The kind of the monomer used in the process of the present invention is not particularly critical, so far as the described conditions are satisfied, but a diacetylene monomer is most preferably used. The diacetylene monomer is represented by the following general structural formula:

wherein R and R' represent a substituent group, for example, a steric-hindrance type group, a non-steric-hindrance group, a steric-hindrance type donor group, a non-steric-hindrance acceptor group, a p-type group or an n-type group.

Typical instances of the non-steric-hindrance type donor group and non-steric-hindrance type acceptor group are shown in Table 3.

TABLE 3

| | Non-steric-hindrance type donor group | Non-steric-hindrance type acceptor group |
|---|---|---|
| A) | —NH₂ ⬡—NH₂ | —NO₂ ⬡—NO₂ |
| B) | —NMe₂ ⬡—NMe₂ | —CN ⬡—CN |
| C) | —OCH₃ ⬡—OCH₃ | —CF₃ ⬡—CF₃ |
| D) | | CF₃ ⬡ CF₃ |
| | —C≡C—NH₂ | —C≡C—NO₂ |

TABLE 3-continued

| Non-steric-hindrance type donor group | Non-steric-hindrance type acceptor group |
|---|---|
| —C≡C—NMe$_2$<br>—C≡C—OCH$_3$ | —C≡C—CN<br>—C≡C—CF$_3$ |
| 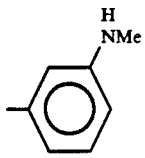 | —F |

Note
Me represents a methyl group.

The donor and acceptor groups shown in columns A, B, C and D in Table 3 sometimes act as steric-hindrance type donor and acceptor groups. Furthermore, these non-steric-hindrance type groups can be converted to steric-hindrance type groups by adding a phenylethyl group, a phenylethylamino group or an acetamide group (—NHCOCH$_3$) or three-dimensionally expanding the monomer by inserting a methylene group or the like into the monomer structure. Furthermore, groups having no electron-donative or electron-acceptive property can be obtained by removing NO$_2$, NH$_2$, NMe$_2$, NHMe, COH$_3$, F, CN or CF$_3$ from the groups shown in Table 3.

Examples of the p-type and n-type groups valuable in the monomer used in the process of the present invention are shown in Table 4.

TABLE 4 p-Type Groups:
 TCNQ (tetracyanoquinodimethane)

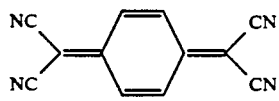

TCNE (tetracyanoethylene)
TCNQF$_4$ (tetrafluorotetracyanoquinodimethane)

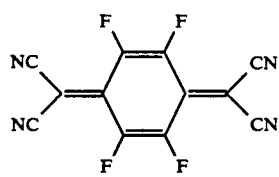

n-Type groups:
 TTF (tetrathiafulvalene)

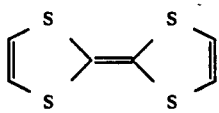

BEDT-TTF [bis(ethylenedithio)tetrathiafulvalene]

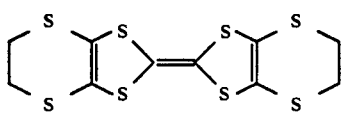

BMTD-TTF [bis(methylenethio)tetrathiafulvalene]

TABLE 4-continued

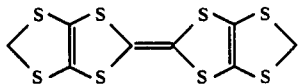

TMT-TTF [tetrakis(methylthio)tetrathiafulvalene]
and TOT-TTF [tetrakis(octadecylthio)tetrathiafulvalene]

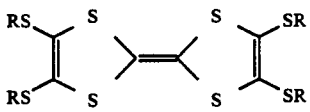

R = CH$_3$: TMT-TTF
R = C$_{18}$H$_{37}$: TOT-TTF
BPDT-TTF [bis(propylenedithio)tetrathiafulvalene]

Furthermore, if these p-type and n-type groups are added to the above-mentioned donor and acceptor groups, p-type donor groups (or acceptor groups) or n-type donor groups (or acceptor groups) can be obtained.

According to the process of the present invention, preferably, an appropriate monomer as mentioned above is blown onto a substrate under vacuum conditions and is irradiated with light, whereby a film is formed. This film-forming process can be carried out under various conditions, and it is especially preferred that the film-forming process be worked under the conditions (1) through (6) described hereinbefore with respect to the preparation of the organic nonlinear optical film.

The function of the process of the present invention will be understood from the description give hereinafter. Several examples of the structure of the diacetylene monomer referred to in the following description will first be described.

FIG. 12A illustrates an example in which a steric-hindrance type group and a non-steric-hindrance type group are added to the terminals of the diacetylene monomer, respectively. FIG. 12B shows an example in which a steric-hindrance type donor group and a non-steric-hindrance type acceptor group are bonded to the terminals of the diacetylene monomer, respectively. FIG. 12C shows an example in which p-type and n-type groups are added to the terminals of the diacetylene monomer, respectively. FIG. 12D illustrates an example in which a p-type donor group and an n-type acceptor group are added to the terminals of the diacetylene monomer, respectively. Note, in FIGS. 12C and 12D, each of the p-type and n-type groups has one single bond, but preferably the p-type and n-type groups are added through at least two single bonds.

Each of the diacetylene monomers shown in FIGS. 12A through 12D has two kinds of added groups in one structure, but as pointed out hereinbefore, at least two kinds of diacetylene monomers can be used, in the state where the same added groups are bonded to the terminals of each monomer.

Figure 13:
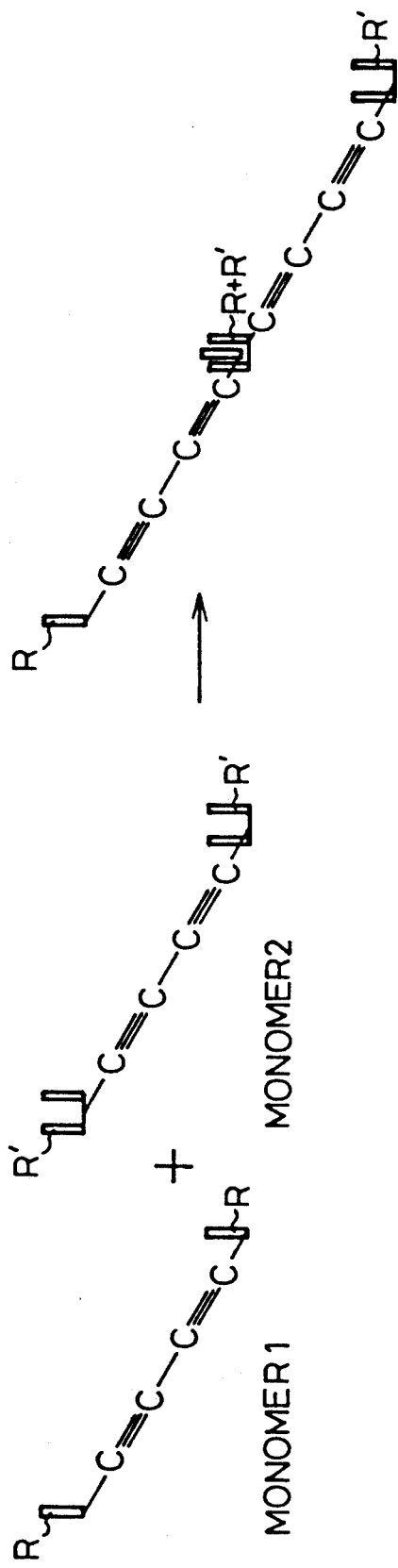
FIG. 13 is a diagram illustrating the mechanism of bonding monomers.

FIG. 13 illustrates the mechanism of bonding between a monomer 1 having added groups R on both the terminals and a monomer 2 having added groups R' on both the terminals. Monomers 1 are not bonded to each other or monomers 2 are not bonded to each other, because of the steric hindrance, but monomers 1 and 2 can be bonded to each other because the groups of both the monomers are easily engaged with one another. The same kind of groups added to the monomers 1 and 2 act so that the steric hindrance occurs, but shapes of different kinds of the added groups are matched to each other and no steric hindrance is caused. This bonding mechanism and effect resemble "whether or not a key is fit to a key hole". Accordingly, the film-forming process of the present invention can be called "LMD" (lock matching deposition) instead of MLE (molecular layer epitaxy).

FIGS. 14A through 14D show several examples of the film-forming process where the same kind of the diacetylene monomer (R-C≡C-C≡C-R') is used. In each of these examples, the kind of the substrate 10 is not particularly critical (for example, a p-type or n-type semiconductor substrate such as a silicon substrate, diacetylene polydiacetylene crystals and the like can be used). However, in order to guarantee the bonding of the monomer to the substrate, preferably the surface of the substrate is subjected to a preliminary treatment such as a hydrophobic treatment, a hydrophilic treatment or an orientation treatment.

Figure 14A:
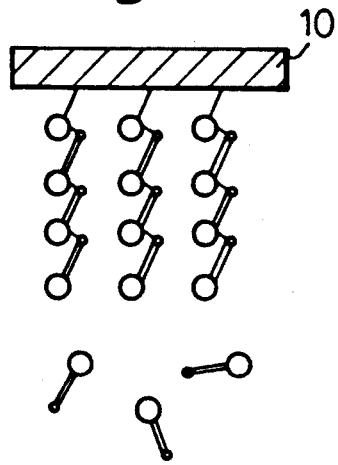
FIGS. 14 through 19 are diagrams illustrating examples of the film formation using a diacetylene monomer.

FIG. 14A shows a film-forming embodiment where a monomer having a steric-hindrance type group and a non-steric-hindrance type group on both terminals is used. In the embodiment shown in FIG. 14A, the surface of the substrate is treated in advance so that the surface is of the non-steric-hindrance type. If steric-hindrance type groups are adjacent to each other, the distance of the diacetylene bonding portion becomes long and no reaction occurs between the monomer. If the steric-hindrance type group is adjacent to the non-steric-hindrance type group, since the monomers approach each other sufficiently, the bonding of the monomers becomes possible as shown in FIG. 14A. Therefore, if a monomer having a steric-hindrance type group added to one terminal and a non-steric-hindrance group added to the other terminal is blown to the substrate, the monomer is deposited on the substrate in the state where the monomer is oriented in a certain direction, as shown in FIG. 14A. Note, bonding of the monomers can be accomplished, for example, by irradiation of the substrate with light.

Figure 14B:
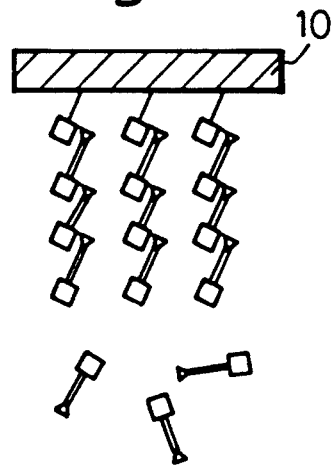

FIG. 14B shows a modification of the embodiment shown in FIG. 14A. A monomer in which the steric-hindrance type group is rendered donative and the non-steric-hindrance type group is rendered acceptive is used. If this monomer is blown onto the substrate, the monomer is deposited in the regular sequent of acceptor (A), donor (D), A, D, . . . , as shown in FIG. 14B.

Figure 14C:
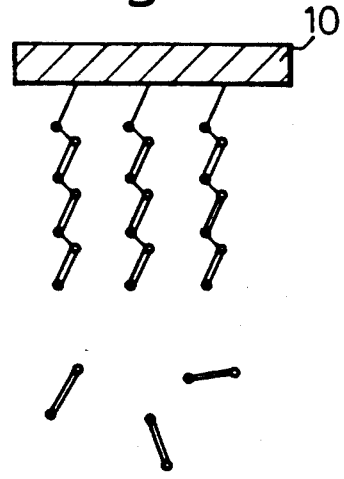
Figure 14D:
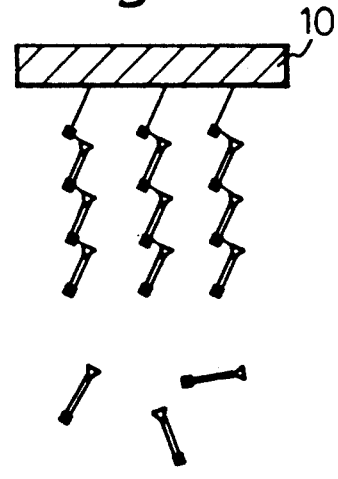

FIG. 14C shows an embodiment in which the adsorptive force between the groups is utilized instead of the above-mentioned steric hindrance for the arrangement of the monomer. As shown in FIG. 14C, the monomer has a p-type group and an n-type group on both the terminals. A repulsive force acts between p-type groups and between n-type groups, but an attraction force acts between p-type and n-type groups. Accordingly, if the monomer having p-type and n-type groups at both the terminals is added, these monomers can be arranged and deposited as shown in FIG. 14C. Furthermore, if the n-type group is rendered donative and the p-type group is rendered acceptive in the monomer used in the embodiment shown in FIG. 14C, the monomers can be arranged and deposited as shown in FIG. 14D.

FIGS. 15A through 15F illustrate a film-forming embodiment in which two kinds of diacetylene monomers 1 and 2 are used. In this embodiment, monomers 1 and 2, each in one layer, are alternately laminated. The monomer 1 has a steric-hindrance type donor group and a non-steric-hindrance type acceptor group on both the terminals, respectively, and the monomer 2 has a steric-hindrance type acceptor group and a non-steric-hindrance type donor group on both the terminals, respectively.

Figure 15A:
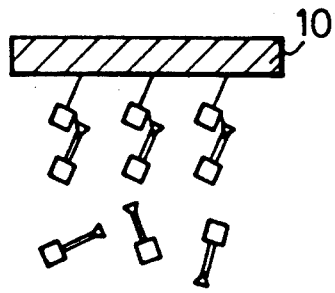
Figure 15B:
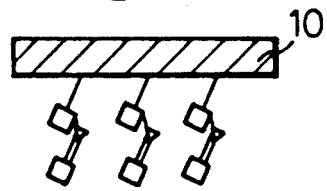
Figure 15C:
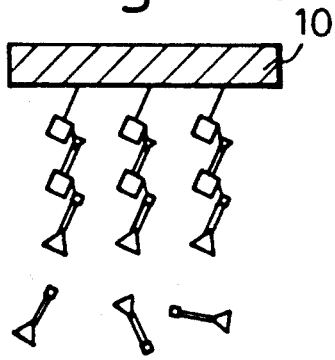
Figure 15D:
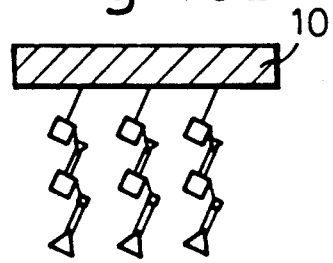
Figure 15E:
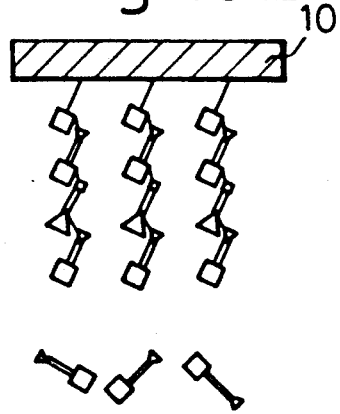
Figure 15F:
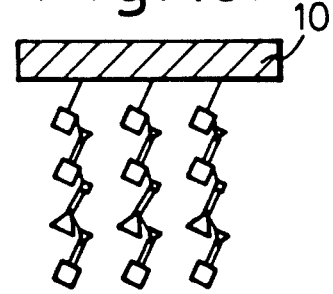
Figure 16A:
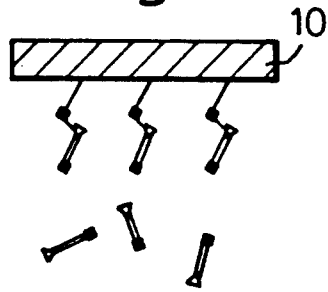
Figure 16B:
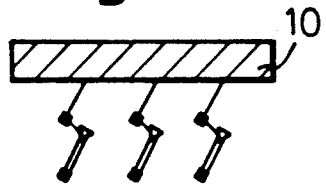
Figure 16C:
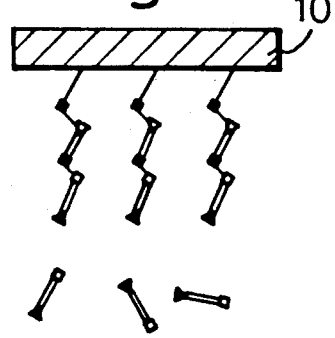
Figure 16D:
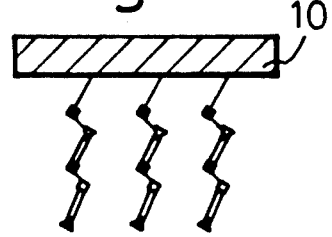
Figure 16E:
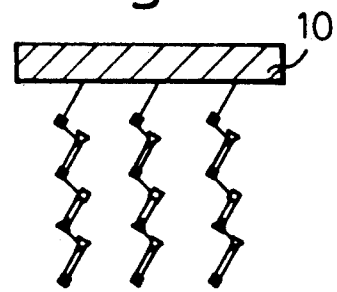
Figure 16F:
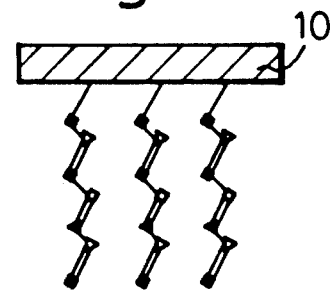

At first, as shown in FIG. 15A, the surface of a substrate 10 is treated so that the surface becomes of the steric-hindrance type donor, and then, the monomer 1 is blown onto the substrate. The non-steric-hindrance type acceptor group of the monomer 1 approaches the site of the steric-hindrance type donor on the surface of the substrate and bonding is generated in the monomer. Then, the monomer 1 present in the system is removed to produce the state shown in FIG. 15B. Then, the monomer 2 is blown to the substrate, as shown in FIG. 15C. The non-steric-hindrance type donor group of the monomer 2 approaches the steric-hindrance type donor group of the previously bonded monomer 1, and bonding is generated in the monomers. Then, the monomer 2 present in the system is removed to produce the state shown in FIG. 15D. Subsequently, the monomers 1 and 2 are alternately bonded in the same manner as described above. Note, FIG. 15E shows the bonding of the monomer 1 and FIG. 15F shows the removal of the monomer 1. If the monomers 1 and 2 are alternately added according to the illustrated process, D-D pairs and A-A pairs are alternately formed as in the form of DD-AA-DD-, . . . , and a diacetylene type long-chain molecule/polymer structure having a large nonlinear optical effect can be obtained.

FIGS. 16A through 16F show a modification of the process shown in FIGS. 15A through 15F. In the present process, the adsorptive force is utilized instead of the steric hindrance utilized in the process shown in FIGS. 15A through 15F. As shown in FIGS. 16A through 16F, monomer 1 has an n-type donor group and a p-type acceptor group on both the terminals, respectively, and monomer 2 has a p-type donor group and an n-type acceptor group on both the terminals, respectively.

The monomers 1 and 2 are alternately added, as shown in FIGS. 16A through 16F. Note, these steps correspond to the steps of FIGS. 15A through 15F, respectively, and therefore, a detailed description of these steps is omitted. As a result, D—D pairs and A—A pairs can be alternately formed, and a diacetylene type long-chain molecule/polymer structure having a large nonlinear optical effect can be obtained.

In the process disclosed in FIGS. 17A through 17F, a film is formed by using two kinds of diacetylene monomers as in the processes shown in FIGS. 15 and 16, but each of monomers 1 and 2 has the same added group on both the terminals. Namely, as shown in FIGS. 17A through 17F, the monomer 1 has a steric-hindrance type group on both the terminals and the monomer 2 has a non-steric-hindrance type group on both the terminals.

Figure 17A:
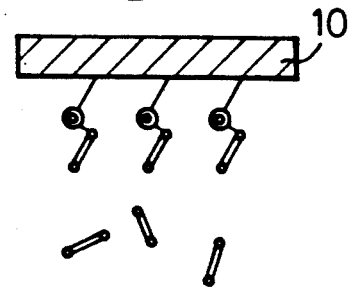
Figure 17B:
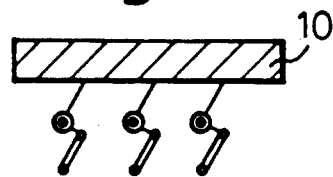
Figure 17C:
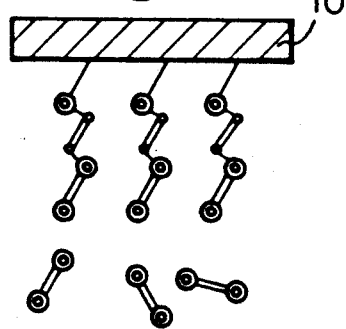
Figure 17D:
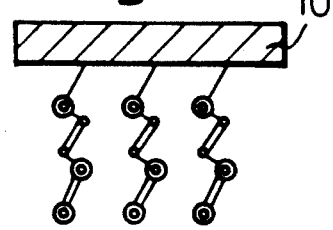
Figure 17E:
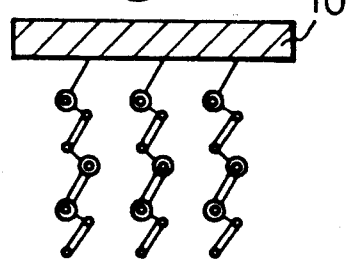
Figure 17F:
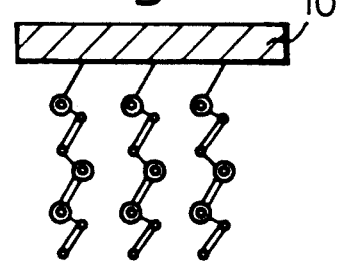

First, as shown in FIG. 17A, the monomer 1 is blown onto a substrate 10. Since the surface of the substrate is —⊙, the steric hindrance to —∘ of the monomer 1 is small. Accordingly, the monomer 1 is deposited as shown in FIG. 17A. If a monomolecular layer of the monomer 1 is formed, further deposition is not caused because the steric hindrance is caused between —∘ and —∘. Then, the monomer 1 present in the system is removed to produce the state shown in FIG. 17B. Then, the monomer 2 is blown onto the substrate, as shown in FIG. 17C. Since the steric hindrance between —∘ of the previously bonded monomer 1 and —o of the monomer 2 is small, the monomer 2 is bonded. When a monomolecular layer of the monomer 2 is formed, since the steric hindrance occurs between —o and —o, no further deposition of the monomer 2 is caused. After the formation of the monomolecular layer of the monomer 2, the monomer 2 left in the system is removed to produce the state shown in FIG. 17D. Subsequently, the monomer 1 and monomer 2 are alternately bonded. Note, FIG. 17E shows the bonding of the monomer 1 and FIG. 17F shows the removal of the residual monomer 1. In the above-mentioned manner, the monomer 1 and monomer 2 can be alternately deposited in monomolecular units.

According to a modification of the above-mentioned process, satisfactory results can be similarly obtained by utilizing the adsorptive force instead of the steric hindrance. For example, a monomer having p-type groups on both the terminals is used as the monomer 1 and a monomer having n-type groups on both the terminals is used as the monomer 2.

FIGS. 18A through 18H illustrate a film-forming embodiment in which four kinds of diacetylene monomers are used and a film is formed according to the same principle as that of the embodiment shown in FIG. 17 (utilization of the steric hindrance). Each of monomers 1 and 2 has donor groups on both the terminals and each of monomers 3 and 4 has acceptor groups on both the terminals.

Figure 18A:
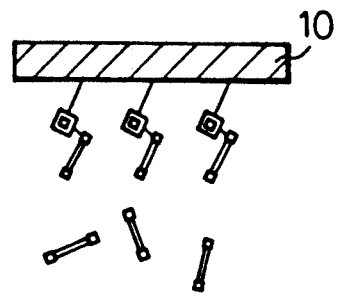
Figure 18B:
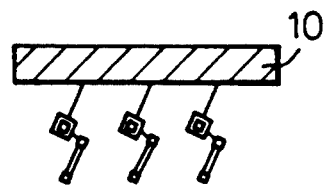
Figure 18C:
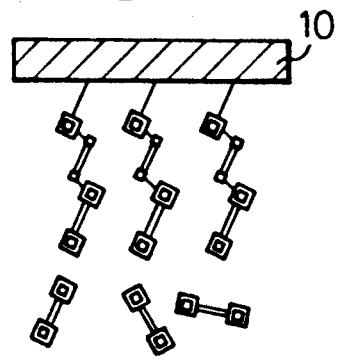
Figure 18D:
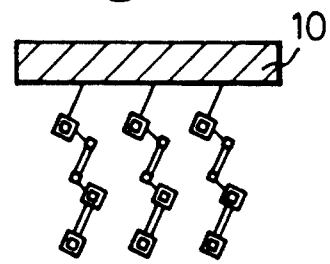
Figure 18E:
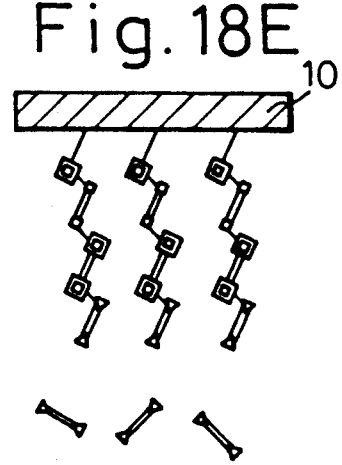
Figure 18F:
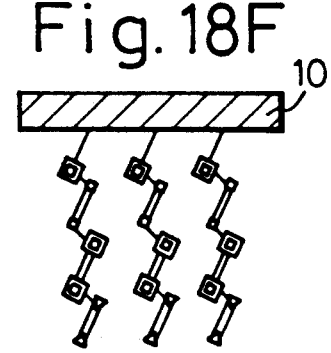
Figure 18G:
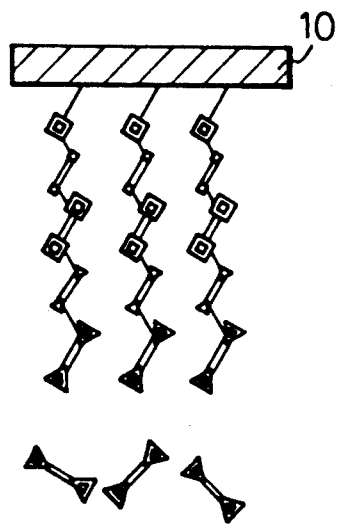
Figure 18H:
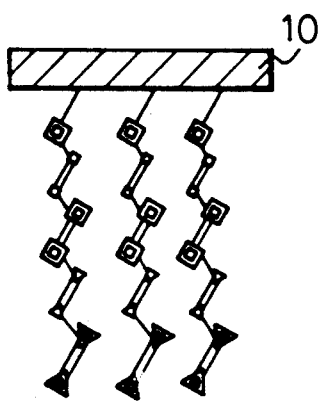

First, the monomer 1 is blown onto a substrate 10, as shown in FIG. 18A. Since the steric hindrance between —▣ and —□ is small, the monomer 1 is bonded to the surface site of the substrate. When a monomolecular layer of the monomer 1 is formed, no further deposition of the monomer 1 is caused. Then, the residual monomer 1 present in the system is removed to produce the state shown in FIG. 18B. Subsequently, as shown in FIGS. 18C, 18D, 18E, 18F, 18G and 18H, bonding of the monomer 2, removal of the residual monomer 2, bonding of the monomer 3, removal of the residual monomer 3, bonding of the monomer 4 and removal of the residual monomer 4 are carried out in sequence. In this manner, the monomers 1 through 4 can be alternately deposited in monomolecular units. In the present embodiment, the donor groups and acceptor groups can be arranged in the sequence of D, D, D, D, A, A, A, A, . . . .

According to a modification of the above-mentioned process, satisfactory results can be similarly obtained by utilizing the adsorptive force instead of the steric hindrance. For example, monomers having p-type groups on both the terminals (the groups per se are different in the monomers) are used as the monomers 1 and 3, and monomers having n-type groups are used as the monomers 2 and 4.

Figure 19A:
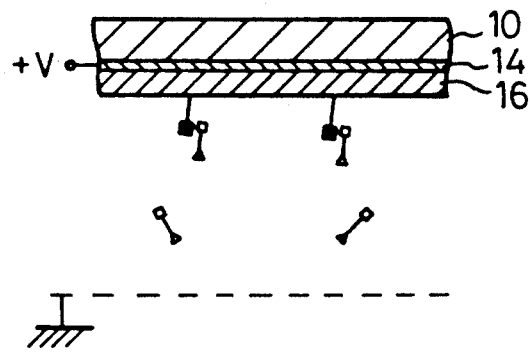
Figure 19B:
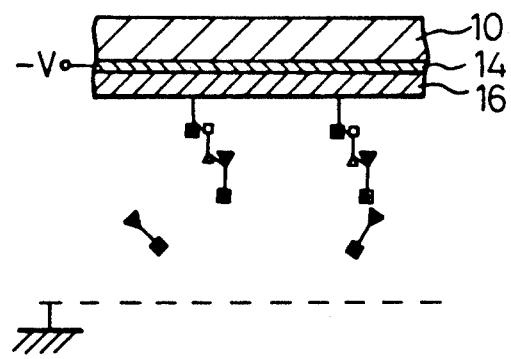
Figure 19C:
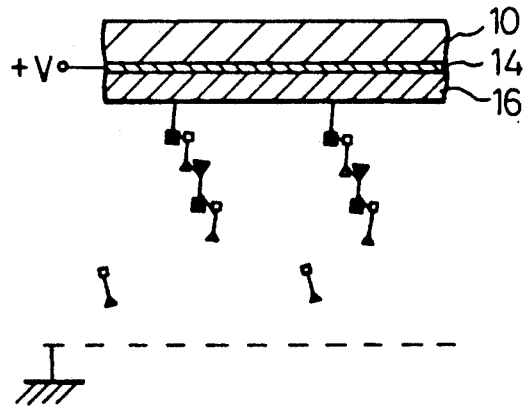

FIGS. 19A through 19C illustrate a modification of the embodiment shown in FIG. 18, wherein the on-off operation of the voltage is simultaneously utilized for the formation of a film. The substrate 10 used in this modification has an electrode 14 and a polydiacetylene film 16, which are formed thereon. The principle of the film formation in this modification is the same as in the foregoing embodiment. Therefore, a detailed description is omitted.

The organic nonlinear optical film according to the present invention can be formed by using the organic film-forming apparatus shown in FIG. 3 and described hereinbefore. The film-forming operation using this apparatus has already been described in detail. Accordingly, the description is omitted here.

As apparent from the foregoing description, according to the process of the present invention, in the preparation of an organic nonlinear optical film, the orientation and deposition can be controlled in the monomer units, and a novel material such as a super lattice polymer can be prepared and the nonlinear optical effect and other physical properties can be improved. Moreover, the process of the present invention can be widely utilized for the production of not only organic nonlinear optical materials but also usual conjugate polymers and long-chain molecules.

The inventor further found that larger quadratic and cubic nonlinear optical effects can be attained by an organic nonlinear optical material comprising a long-chain conjugate molecule or polymer having a conjugate main chain in the molecule, in which at least two quantum wells (potential wells) are formed on the conjugate chain.

As in the foregoing embodiments, the long-chain conjugate molecule or polymer constituting the organic nonlinear optical material of the present invention is not particularly critical, so long as the molecule or polymer has a conjugate main chain in the molecule. In general, however, polymers of diactylene, polyene, graphite, polyphenyl and polyacene types are preferably used. As in the foregoing embodiments, for facilitating the understanding, the description will now be made with reference to polydiacetylene.

Preferably, donor groups D and acceptor groups A are added onto the conjugate main chain of the long-chain conjugate molecule or polymer, but the kinds and distributions of these groups are not particularly critical. For example, these groups can be alternately added in the sequence of . . . , D, A, D, A, D, A, . . . , or they can be added in the form of pairs (D—D pair and A—A pair) in the sequence of . . . , D, D, A, A, D, D, . . . . Moreover, the donor group D can be added to one of both the terminals of the conjugate main chain and the acceptor group A can be added to the other terminal. Alternatively, the donor groups D or acceptor groups A can be added to both the terminals. If necessary, neutral groups, for example, hydrogens (H), may be present in addition to the donor groups D and acceptor groups A.

Optical groups selected from groups evaluated to be valuable in the art can be used as the donor group D and acceptor group A to be added onto the conjugate main chain. Preferred examples are shown in Table 1 given hereinbefore.

As pointed out hereinbefore, the long-chain conjugate molecule or polymer has at least two quantum wells on the conjugate main chain thereof. The number of the quantum wells is preferably 2. The two quantum wells are preferably arranged through an intervening barrier. It is preferred that two quantum wells are arranged through one barrier on both the terminals of the conjugate main chain. Formation of the quantum well can be advantageously accomplished by controlling the addition positions of the donor group D and acceptor group A. Inversion symmetry is given or not given to the region of the quantum well or the barrier region between the wells, according to the intended object.

Still further, the inventor found that larger quadratic and cubic nonlinear optical effects can be attained and the material concentration and orientation can be increased in an organic nonlinear optical material characterized in that long-chain conjugate molecules or polymers having a conjugate main chain in the molecule are connected to one another through other molecule different from these molecules or polymers in the energy gap. If molecules or polymers having a conjugate main chain are connected to one another through other molecule different from the molecules or polymers in the energy gap to form a higher polymer, a high-concentration and high-orientation organic non-linear optical material can be provided.

The organic nonlinear optical material of the present invention includes various embodiments. For example, not only molecules or polymers having a conjugate main chain as the main molecule but other molecule different in the energy gap for connecting these molecules or polymers (hereinafter referred to as "spacer molecule") can have a conjugate main chain according to need. If the spacer molecule has a conjugate main chain, the main molecule and the spacer molecule can have similar main chain skeletons. If the main molecule and spacer molecule have the same skeleton structure, they may be different in the kinds of the added substituents. Preferably, only the main molecule has a polyacetylene type structure, or both of the main molecule and the spacer molecule have a polydiacetylene type structure.

According to still another embodiment of the present invention, there is provided an organic nonlinear optical material characterized in that the band gap of the conjugate chain of the long-chain conjugate molecule or polymer constituting the material is periodically changed. In this embodiment, the increase of the nonlinear optical characteristic by the super lattice effect, reported with respect to the conventional compound of groups III-V, is introduced into the organic one-dimensional conjugate system, and the nonlinear optical effect of the organic nonlinear optical material is effectively improved.

The periodical change of the band gap of the conjugate chain is realized, for example, by controlling the kinds or addition sites of the donor groups D and acceptor groups A. Furthermore, the band gap can be periodically changed by periodically changing the composition of the conjugate chain.

According to a further embodiment of the present invention, there is provided an organic nonlinear optical material characterized in that in the long-chain conjugate molecule or polymer having a conjugate chain, the energy gap is controlled by changing the kinds or addition sites of the donor groups D and acceptor groups A. The control of the energy gap is very important for broadening the application range of the organic nonlinear optical material. The reason is that although a long-chain conjugate molecule or polymer having a conjugate chain is valuable not only as a nonlinear optical material but also as various optical functional materials, the wavelength of applicable light in practical use of the molecule or polymer depends greatly on the energy gap of the material. Preferably, the groups D and groups A are used in the form of pairs and the distance between the D—D pair and the A—A pair is changed, or the groups D and groups A are used in the form of blocks and the distance between the block D and block A is changed.

The organic nonlinear optical material of the present invention can take various forms. For example, as pointed out hereinbefore, the optical material of the present invention can be in the form of an organic nonlinear optical film in one aspect. In this optical film, the above-mentioned long-chain conjugate molecules or polymers are contained in the state where they are periodically arranged. According to the present invention, this organic nonlinear optical film can be prepared according to a process comprising depositing a component (hereinafter referred to as "monomer") capable of forming a molecule or polymer constituting the organic nonlinear optical material on a substrate and polymerizing the monomer while promoting bonding of the monomer by irradiation with light. This film-forming process preferably comprises polymerizing the monomer while orienting the monomer by an electric field. This film-forming process can be carried out according to the above-mentioned procedures by using the above-mentioned apparatus.

According to another aspect, the organic nonlinear optical material can be in the form of an organic nonlinear optical dispersion of the optical material in a medium. This optical dispersion as well as the above-mentioned optical film has already been described in detail, and the optical dispersion can be prepared according to the above-mentioned procedures by using the above-mentioned apparatus.

In the organic nonlinear optical material of the present invention, at least two quantum wells are formed on the conjugate main chain of the molecule or polymer. If these wells are formed, the electron wave functions in the ground state (or the valence band) and the excited state (or the conduction band) are concentrated in the wells or in the vicinity thereof. The nonlinear optical constant is almost proportional to the power of the probability $\gamma_{eg}$ of the transition to the excited state from the ground state, as represented by the following formula:

$$\gamma_{eg} \propto \int \psi_g \gamma \psi_e d\gamma$$

wherein $\psi_g$ and $\psi_e$ represent the wave functions in the ground state and in the excited state, respectively, and $\gamma$ represents the position coordinate, and therefore, in order to improve the nonlinear optical effect, preferably $\psi_g$ and $\psi_e$ are located at points as close to both the terminals of the molecule as possible. The effect of the organic nonlinear optical material of the present invention is due greatly to this feature.

FIGS. 20A and 20B illustrate the organic nonlinear optical material of the present invention and the formation of quantum wells formed in this material with reference to the polydiacetylene type structure as an example. FIG. 20A shows the structure and FIG. 20B shows the band diagram. In the band diagram, V.B. represents the valence band, and C.B. represents the conduction band. As shown in FIGS. 20A and 20B, quantum wells are constructed by A-A-D-D-A-A, that is, the combination of acceptor pair-donor pair-acceptor pair, at positions slightly inner from both the terminals of the conjugate chain. The formation of wells can be performed according to customary procedures by using, for example, the MBE apparatus.

Figure 21A:
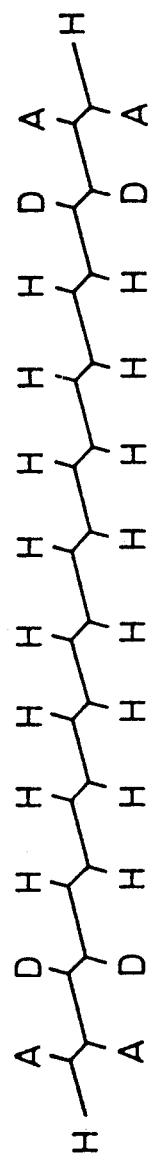
Figure 21B:
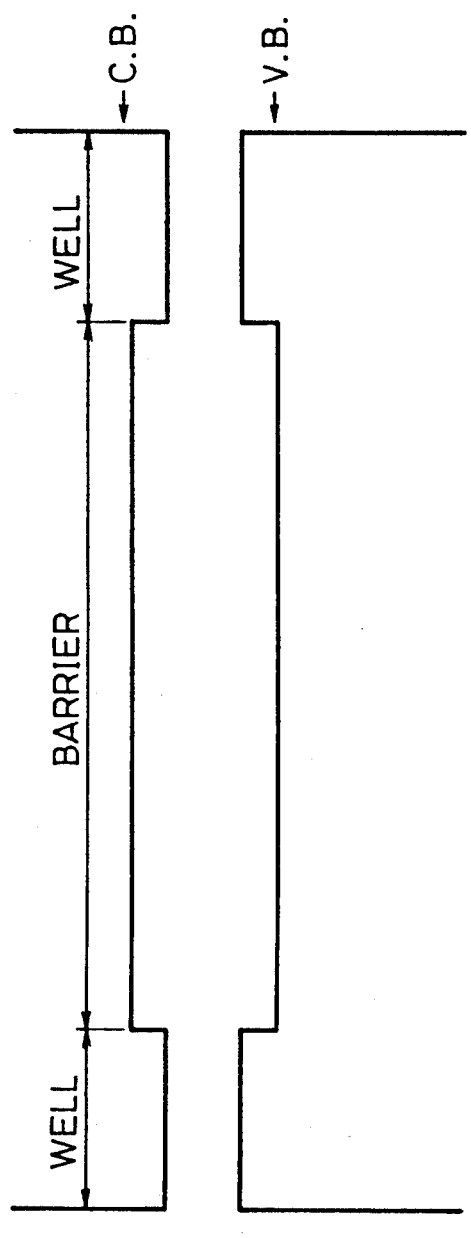
Figures 23A, 23B:
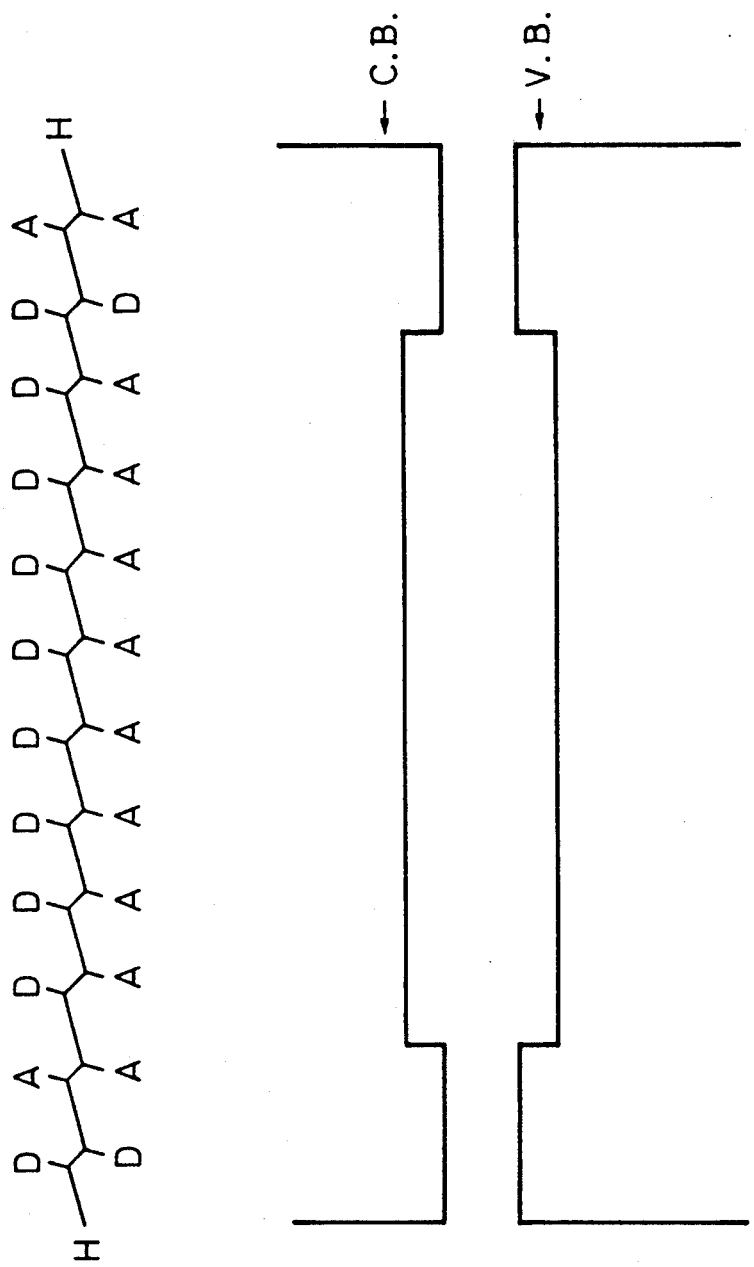

FIGS. 21A and 21B show a modification of the embodiment shown in FIG. 20. As shown in FIGS. 21A and 21B, quantum wells are formed by D-D-A-A, that is, the combination of donor pair-acceptor pair, on both the terminals of the conjugate main chain.

If wells are formed as shown in FIGS. 20 and 21, the electron wave functions in the ground state (or the valence band) and the excited state (or the conduction band) are concentrated in the wells or in the vicinity thereof, and as the result, the nonlinear optical effect can be improved. For example, if the case where the carbon number of the main chain is 38 and wells are formed throughout the main chain is compared with the case where wells are formed on both the terminals and a barrier is formed in the central region (the example of the present invention), the cubic nonlinear molecule polarizability $\gamma$ of the latter case is about 2 times the polarizability $\gamma$ of the former case.

FIGS. 22A and 22B and FIGS. 23A and 23B show the structures in which attainment of the quadratic nonlinear optical effect is intended. FIGS. 22 and 23 correspond to FIGS. 20 and 21, respectively, but to impart an inversion symmetry to both of the wells and barrier layer, the kinds of added groups are changed.

The organic nonlinear optical material of the present invention can take various forms, for example, an organic nonlinear optical film, an organic nonlinear optical dispersion, a side chain type polymer and the like.

The organic nonlinear optical film can be prepared according to the above-mentioned procedures by using, for example, the organic film-forming apparatus shown in FIG. 3. As pointed out hereinbefore, a film is prepared by blowing a monomer capable of forming the conjugate polymer onto a substrate and irradiating the substrate with light. The irradiation with light is carried out steadily or simultaneously with the blowing of the monomer onto the substrate, or the irradiation with light is carried out intermittently. Further, the monomer may be polymerized after formation of the layer of the monomer. Furthermore, the blowing of the monomer and the irradiation with light can be carried out alternately, whereby the polymerization reaction will be performed more completely. A plurality of monomers can be used, and if these monomers are simultaneously blown onto the substrate, a copolymer can be obtained. If a plurality of monomers are blown alternately to the substrate, a super lattice of a one-dimensional polymer can be obtained.

According to the above-mentioned process, by generating an electric field in the vicinity of the substrate, the orientation characteristic of the monomer and hence, the orientation characteristic of the polymer chain can be improved, and therefore, the nonlinear optical characteristics can be improved. This process is especially suitable for controlling the arrangement of the donor groups D and acceptor groups A in the polymer.

Furthermore, as pointed out hereinbefore, if several monomers are laminated and an insulating layer is inserted in the laminate, quantum wells of a conjugate one-dimensional polymer molecule can be formed. More specifically, as shown in FIG. 5 explained hereinbefore, several conjugate molecules or conjugate molecule chains 18 are arranged on a substrate 10, insulating or non-electron-conductive molecules 19 are arranged, and these operations are repeated in the same manner, whereby a film is formed (please refer to the foregoing detailed description with respect to the formation of quantum wells).

As pointed out hereinbefore, an organic nonlinear optical dispersion can be prepared as well as the above-mentioned organic nonlinear optical film. Namely, in the above-mentioned film-forming process, a flying long-chain molecule or monomer is oriented by an electric field generated in the vicinity of a substrate, and simultaneously, a polymer-forming substance such as MMA (methyl methacrylate) or a glass-forming substance such as $SiO_x$ is blown to the substrate, whereby a film-shaped oriented dispersion can be prepared (please refer to the detailed description given hereinbefore).

FIGS. 24A and 24B illustrate the connection (polymerization) of long-chain conjugate molecules according to the present invention with reference to the polydiacetylene structure as an example. FIG. 24A shows the structure and FIG. 24B shows the band diagram. Note, in the band diagram, V.B. represents the valence band and C.B. represents the conduction band. Molecules are connected through a spacer located between every two adjacent molecules and a large polymer is formed as a whole.

In the organic nonlinear optical material shown in FIG. 24, the skeleton as a whole has a polydiacetylene structure. In the embodiment shown in FIG. 24, the portion of AA-DD-AA-DD-AA-DD is a long-chain conjugate molecule showing the nonlinear optical characteristics, and the portion of HH-HH-HH is a spacer having a large energy gap. Hydrogen (H) of the spacer can be replaced by other group deficient in the donative and acceptive characteristics according to need. The spacer has a broad band gap as well as the quantum well and acts as a barrier connecting and separating the adjacent long-chain conjugate molecules. The material can be prepared in the same manner as described above.

In the embodiment shown in FIG. 24, since the long-chain conjugate molecules have no inversion symmetry, a quadratic nonlinear optical effect is manifested. The structure of the long-chain conjugate molecule is not limited to one shown, but various structures can be realized by changing the kinds, addition sites and molecule lengths of the donor groups D and acceptor groups A, and moreover, various structures can be given to the portion of the spacer. Namely, the structure of the portion of the spacer need not be made in agreement with the skeleton structure of the long-chain conjugate molecule structure, and the spacer portion may be formed of a molecule having no conjugate $\pi$-electron, such as $+CH_2+_n$.

Figure 25A:
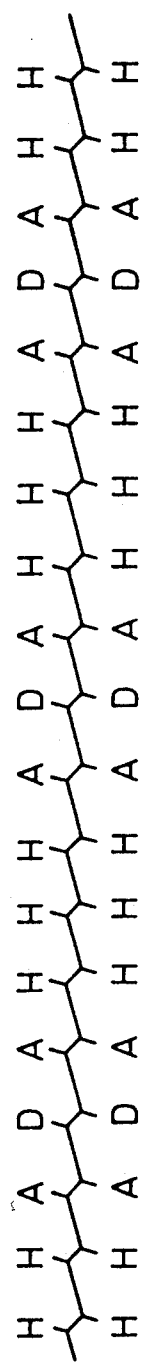
Figure 25B:
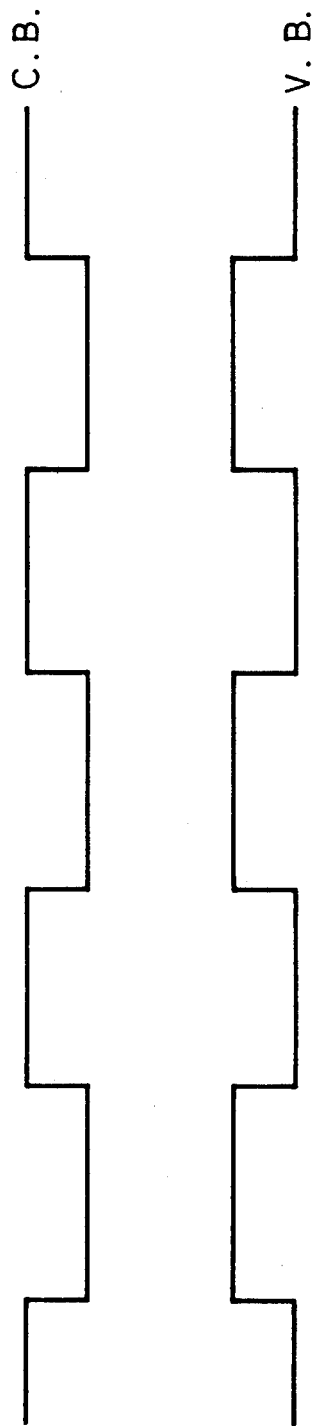

FIGS. 25A and 25B and FIGS. 26A and 26B illustrate periodical changes of the band gap according to the present invention with reference to a polydiacetylene type conjugate polymer as an example. Each of FIGS. 25A and 26A shows the structure of the polymer, and each of FIGS. 25B and 26B shows the band diagram.

In each of the embodiments shown in FIGS. 25 and 26, donor-donor pairs (D—D pairs) and acceptor-acceptor pairs (A—A pairs) are alternately added to form periodically appearing quantum wells. In the embodiment shown in FIG. 25, the length of the well portion is the same as the length of the barrier portion, but in the embodiment shown in FIG. 26, the length of the well portion is shorter than the length of the barrier portion. If such polymer structures are formed, periodic potentials are generated to form a one-dimensional super lattice, with the result that the deviation of the energy curve to the momentum from the parabola increases and the cubic nonlinear optical effect increases. Note, this super lattice can be prepared according to the above-mentioned film-forming process.

Figure 27A:
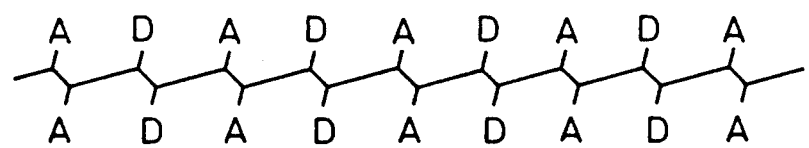
FIG. 27 is a diagram illustrating an example of a diacetylene type long-chain molecule according to the present invention.
Figure 27B:
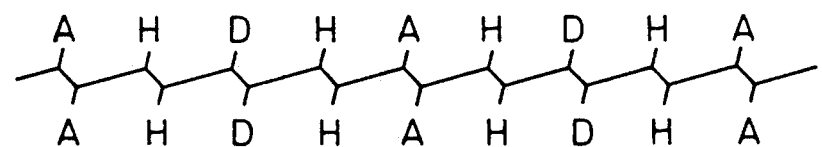
Figure 27C:
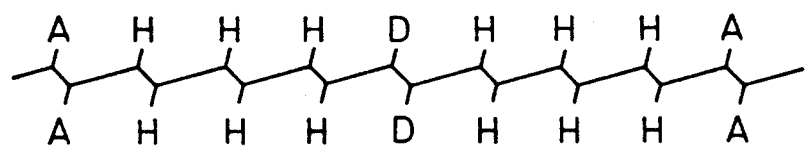

FIGS. 27A through 27C illustrate the control of the energy gap according to the present invention with reference to a diacetylene type long-chain molecule as an example. In each of the embodiments shown in FIGS. 27A through 27C, the donor group D is —NH$_2$ and the acceptor group A is —NO$_2$.

In the embodiment shown in FIG. 27A, it will be understood that the D—D pair separates from the A—A pair by a distance corresponding to one of ≠C—C≡C—C≠. In the embodiment shown in FIG. 27B, the pair D—D separates from the pair A—A by a distance corresponding to two of ≠C—C≡C—C≠. Similarly, in the embodiment shown in FIG. 27C, the pair D—D separates from the pair A—A by a distance corresponding to four of ≠C—C≡C—C≠. Such a difference results in a large change of the energy gap.

With regard to the dependency of the energy gap on the pair-to-pair distance with respect to the diacetylene type long-chain molecules (A), (B) and (C) shown in FIG. 27, the energy gap can increase in the order described.

The energy gap can also be changed by changing the kinds of the donor groups D and acceptor groups A, though this embodiment is not specifically illustrated in the accompanying drawings. For example, if the donor groups D and acceptor groups A are changed to groups having weak donative characteristics and groups having weak acceptive characteristics, respectively, the energy gap can be shifted to a higher energy side. A contrary effect can be obtained by using groups having strong donative characteristics and groups having strong acceptive characteristics. In the present embodiment, the control of the energy gap is illustrated with reference to the diacetylene type long-chain molecule, but similar effects can be attained when the present invention is applied to other conjugate chains such as a polyphenyl type conjugate chain, a polyene type conjugate chain, a polyacene type conjugate chain and a graphite type conjugate chain. Furthermore, similar effects can be attained even when the long-chain molecule is elongated to form a polymer. Moreover, the state of addition of the donor groups D and acceptor groups A is not limited to one shown in FIG. 27. As described in detail hereinafter, the state of donor blocks (D, D, D, ..., D, D) and acceptor blocks (A, A, A, ..., A, A) and other states can be adopted. Note, the organic nonlinear optical material of the present embodiment also can be prepared according to the above-mentioned film-forming process.

As apparent from the foregoing description, the organic nonlinear optical material of the present invention has a much higher nonlinear optical effect than the conventional materials. Accordingly, if this material is applied to an electro-optical element and an optical-to-optical element, the device characteristics can be improved. Furthermore, according to the present invention, a nonlinear optical material in which a nonlinear optical molecule is present at a high concentration in the highly oriented state can be realized. Moreover, according to the present invention, a one-dimensional super lattice having an excellent nonlinear optical effect can be realized. Still further, according to the present invention, since the energy gap of the long-chain conjugate molecule or polymer can be controlled, the application range of the obtained nonlinear optical material can be broadened.

Still further, the inventor found that higher quadratic and cubic nonlinear optical effects can be attained by an organic nonlinear optical material comprising a long-chain conjugate molecule or polymer having in the molecule a conjugate main chain onto which a plurality of donor groups and a plurality of acceptor groups are added in units of blocks.

The long-chain conjugate molecule or polymer constituting the organic nonlinear optical material of the present invention can be the same molecule or polymer as mentioned above, and therefore, the description is omitted here.

As pointed out hereinbefore, the organic nonlinear optical material of the present invention is characterized in that a plurality of donor groups and a plurality of acceptor groups are contained in units of blocks. Namely, the optical material of the present invention is characterized in that a donor block comprising a plurality of donor groups D and an acceptor block comprising a plurality of acceptor groups A are arranged at appropriate positions of the long-chain conjugate molecule or polymer.

The donor and acceptor blocks can have optical (plural) numbers of donor groups D and acceptor groups A, and the states and distributions of these blocks are optional. For example, the donor blocks and acceptor blocks are preferably arranged alternately. One end of the conjugate molecule or polymer can be a donor block and the other end can be a donor block or acceptor block. In contrast, one end can be an acceptor block and the other end can be an acceptor block or donor block. It should be understood that the arrangement of these blocks can be optionally changed according to the intended object.

The organic nonlinear material of the present invention can contain regions free of donor groups D and acceptor groups A, that is, so-called neutral blocks, in addition to the donor blocks and acceptor blocks. In general, the neutral blocks are formed by substituting the groups D of the donor blocks and the groups A of the acceptor blocks with hydrogen atoms (H). The arrangement of the neutral blocks is optional as well as the arrangement of the donor blocks and acceptor blocks. For example, this neutral block can be interposed between the adjacent donor block and acceptor block.

Optical groups selected from the groups evaluated to be valuable in the art can be used as the donor group D and acceptor group A to be added onto the conjugate main chain. Preferred examples are shown in Table 1 given hereinbefore.

As described hereinbefore, the organic nonlinear optical material of the present invention can take various forms. In accordance with one aspect, the optical material of the present invention can be an organic nonlinear optical film. In accordance with another aspect, the optical material of the present invention can be an organic nonlinear optical dispersion of the optical material in a medium. These nonlinear optical film and nonlinear optical dispersion can be prepared according to the process described in detail hereinbefore.

The organic nonlinear optical material of the present invention can have a quantum well according to need, as well as the optical materials of the non-block type described hereinbefore. The optical material having a quantum well structure can take various forms. Moreover, the optical material can have an exciton-binding center at a part of the conjugate main chain, and this material having an exciton-binding center can take various forms.

As apparent from the foregoing description, according to the present invention, by forming a donor block comprising a plurality of donor groups D and an acceptor block comprising a plurality of acceptor groups A at appropriate positions of a long-chain conjugate molecule or polymer, electron wave functions are modified, and therefore, large nonlinear optical characteristics can be attained in the obtained organic nonlinear optical material.

The organic nonlinear optical material of the present invention can have block arrangements shown in FIGS. 28A through 28D.

Figure 28A:
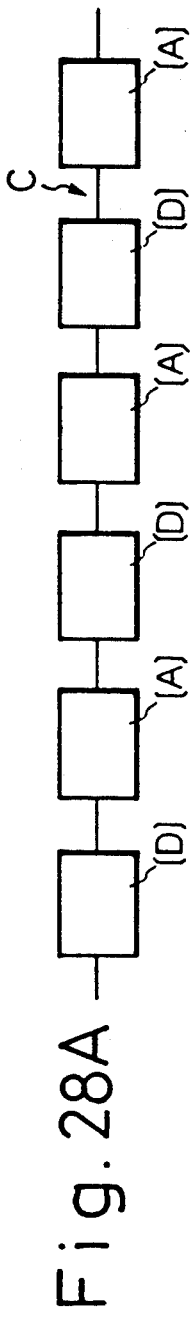
FIG. 28 is a diagram illustrating the arrangement of blocks in the organic nonlinear optical material of the present invention.
Figure 28B:
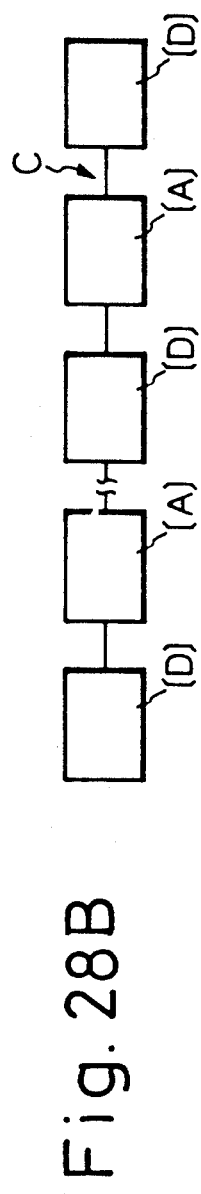
Figure 28C:
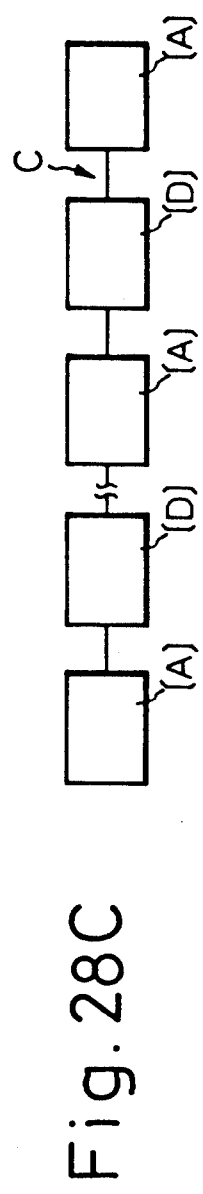

FIG. 28A illustrates an embodiment in which donor blocks [D] and acceptor blocks [A] are alternately arranged on a conjugate main chain C of a long-chain conjugate molecule or polymer. Each block [D] has a plurality of donor groups and each block [A] has a plurality of acceptor groups. Both ends of the conjugate main chain C can be terminated with either the donor block [D] or the acceptor block [A]. For example, the initial end can be the block [D] and the terminal end can be the block [A], or on the contrary, the initial end can be the block [A] and the terminal end can be the block [D]. Furthermore, both ends of the conjugate main chain can be terminated with the block [D], as shown in FIG. 28B, or with the block [A], as shown in FIG. 28C.

Figure 28D:
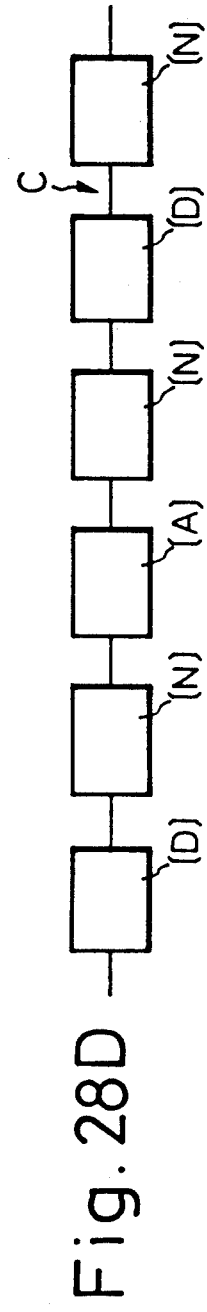

FIG. 28D illustrates an embodiment in which donor blocks [D] and acceptor blocks [A] are alternately arranged on a conjugate main chain of the long-chain conjugate molecule or polymer and a neutral block [N] is interposed between adjacent blocks [D] and [A]. As pointed out hereinbefore, by the neutral block [n] is meant a region to which a donor group or an acceptor group is not added. In this embodiment, group is not added. In this embodiment, the block [n] is arranged between the blocks [D] and [A]. Of course, other arrangements can be adopted.

FIGS. 29A through 29C, FIGS. 30A through 30C and FIGS. 31A through 31D illustrate structures of the organic nonlinear optical material with reference to polydiacetylene as a typical instance of the nonlinear polymer. In this polymer, each donor block comprises four donor groups D and each acceptor block comprises four acceptor groups A (see FIGS. 29A, 30A and 31A and FIGS. 29B, 30B and 31B).

Figure 29A:
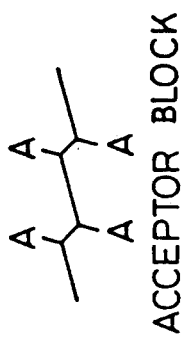
FIGS. 29 through 31 are diagrams illustrating structures of organic nonlinear optical materials.
Figure 29B:
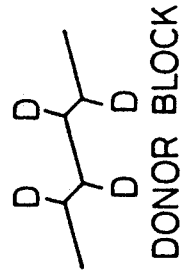
Figure 29C:
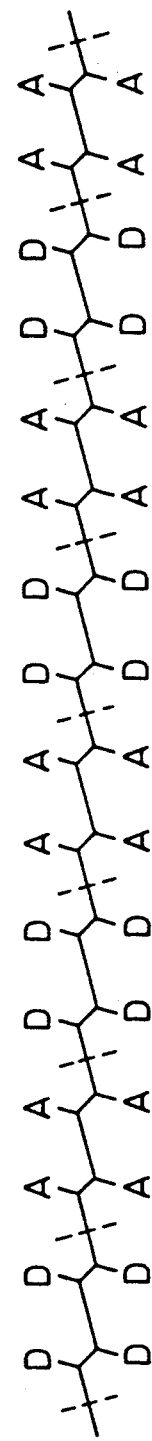
Figure 30B:
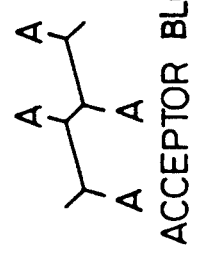
Figure 30A:
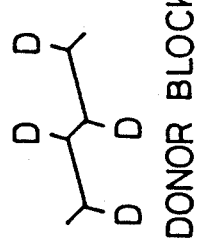
Figure 30C:
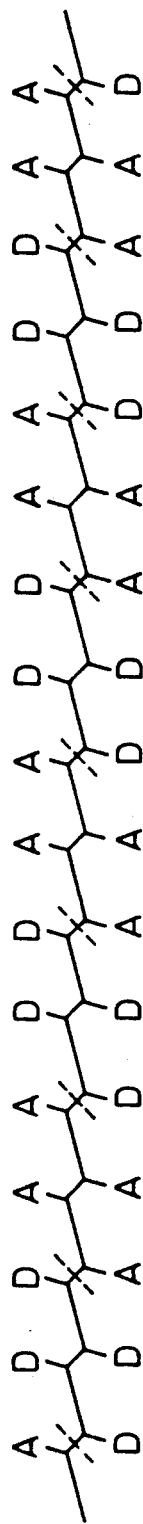

The polydiacetylene of FIG. 29C is in agreement with the polydiacetylene of FIG. 30C in that the donor blocks and acceptor blocks are alternately arranged, but they are different in the addition sites of the donor groups D and acceptor groups A. The polydiacetylene having the structure shown in FIG. 30C can be prepared more easily than the polydiacetylene having the structure shown in FIG. 29C.

Figure 31A:
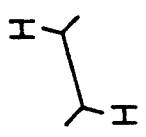
Figure 31B:
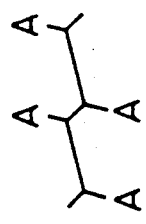
Figure 31C:
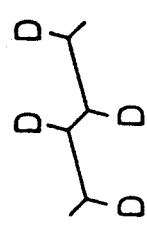

FIG. 31 illustrates an embodiment in which neutral blocks shown in FIG. 31C are combined with the donor blocks shown in FIG. 31A and the acceptor blocks FIG. 31B. In the disclosed polydiacetylene, as shown in FIG. 31D, the neutral block is inserted between the donor block and the acceptor block.

In each of FIGS. 29 through 31, only a part of the conjugate main chain of the polydiacetylene is shown. Also in this conjugate main chain, if both ends of the block line are terminated with the donor blocks or acceptor blocks as shown in FIG. 28B or 28C and the conjugate main structure has an inversion symmetry, the obtained polydiacetylene is a cubic nonlinear optical material. If both ends of the block line are terminated with different blocks, for example, the donor block (or the acceptor block) and the acceptor block (or the donor block), respectively, the obtained polydiacetylene exerts a quadratic nonlinear optical effect. For example, if the number of carbon atoms constituting the main chain is about 10 to about 30, this polydiacetylene has a quadratic nonlinear molecule polarizability ($\beta$) more than 10 times as large as that of MNA. This material is further characterized in that the energy gap is narrowed by the charge transfer effect between the donor block and acceptor block. If this characteristic is utilized and donor blocks and acceptor blocks are selectively formed at parts of the conjugate main chain, quantum wells, super lattices and the like can be formed.

Figure 31D:
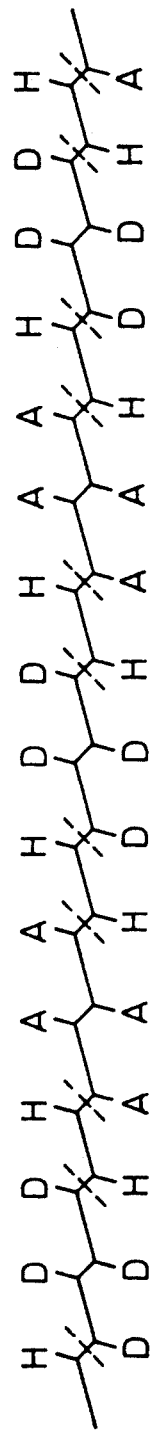
Figure 32A:
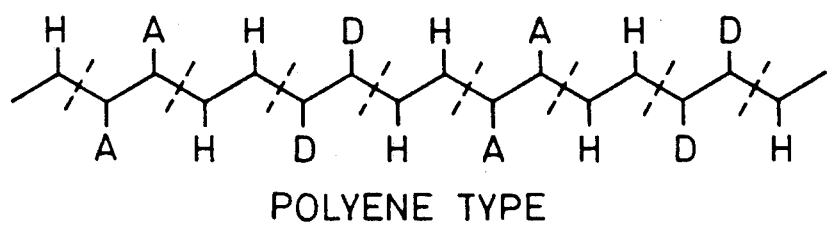
FIGS. 32A through 32C are diagrams illustrating skeletons of organic nonlinear optical materials.
Figure 32B:
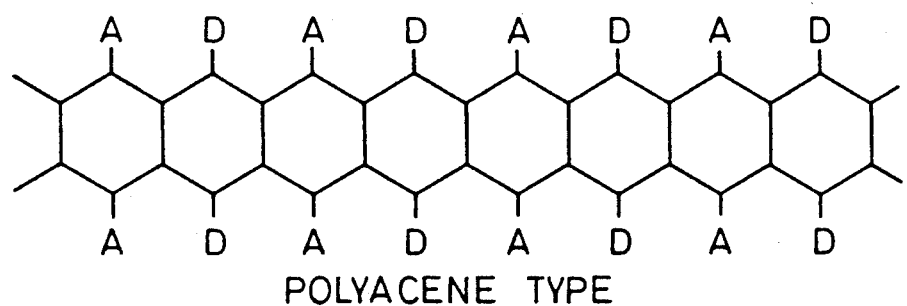
Figure 32C:
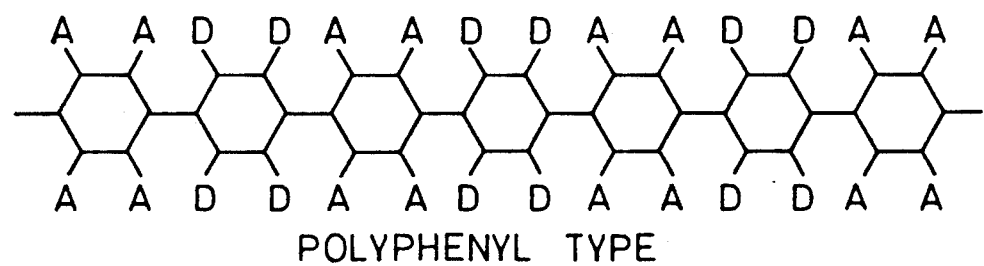

Examples of the structure where the organic nonlinear optical material of the present invention is composed of polydiacetylene have been described with reference to FIGS. 29 through 31. Examples of the donor group D and acceptor group A to be added onto the conjugate main chain of this conjugate polymer are illustrated in Table 1 given hereinbefore. Although substituents on the neutral blocks are represented by hydrogen atoms (H), they can be replaced by other substituents according to need. The number of carbon atoms constituting the conjugate main chain of the organic nonlinear optical material inclusive of polydiacetylene is preferably 10 or larger. The type of the main chain is not limited to the above-mentioned diacetylene type, but any of types capable of forming a conjugate chain, for example, polyene, graphite, polyphenyl and polyacene types, can be adopted. FIGS. 32A through 32C illustrate three kinds of the skeleton of the organic nonlinear organic material together with donor groups D and acceptor groups A. Incidentally, FIG. 32A shows a polyene type structure, FIG. 32B shows a polyacene type structure, and FIG. 32C shows a polyphenyl structure. In these structures, the arrangement of A, D and H can be freely changed. For example, in the structure of the polyacene structure shown in FIG. 32B, A and D can be arranged only on one of the upper and upper sides, not on both the upper and lower sides, and H may be further introduced.

The organic nonlinear optical material of the present invention can take various forms, as pointed out hereinbefore, and for example, the optical material of the present invention can be an organic nonlinear optical film, an organic nonlinear optical dispersion or the like. These film and dispersion can be prepared in the same manner as described above. For example, the organic nonlinear optical film can be prepared by using the organic film-forming apparatus shown in FIG. 3.

For example, the polydiacetylene shown in FIG. 31D can be prepared in the following manner by using the apparatus shown in FIG. 3.

Three diacetylene monomers, (1) D—C≡C—C≡C—D (monomer 1), (2) H—C≡C—C≡C—H (monomer 2) and (3) A—C≡C—C≡C—A (monomer 3), are prepared. These monomers are charged in K cells 2, 3 and 4 in a bell jar 1, respectively, and the monomer molecules in the respective K cells are blown to a substrate 10 in an appropriate order while controlling the blowing of each monomer molecule by a monomolecular unit. For example, two molecules of the monomer 1, one molecule of the monomer 2, two molecules of the monomer 3 and one molecule of the monomer 2 are blown to the substrate, and two molecules of the monomer 1 are blown again and the blowing of the monomers is repeated in the above-mentioned order, whereby a conjugate chain is grown and an intended material is obtained. The control by a monomolecular unit can be correctly accomplished by monitoring the film-forming process by the in-situ observation by RHEED pattern or STM and opening or closing shutters 5 on the K cells. Structures other than the diacrylene type structure can be formed, in principle, in the same manner as described above.

According to the above-mentioned process, by generating an electric field in the vicinity of the substrate, the orientation characteristic of the monomer and in turn, the orientation characteristic of the polymer chain can be improved, and hence, the nonlinear optical characteristics can be improved. This process is especially suitable for controlling the arrangement of the donor groups D and acceptor groups A in the polymer.

Furthermore, if several monomers are laminated and an insulating layer is then inserted into the laminate, a quantum well of a conjugate one-dimensional polymer molecule can be formed. Namely, as described hereinbefore with reference to FIG. 5, several conjugate molecules or conjugate molecule chains 18 are arranged on the substrate 10 and an insulating or non-electron-conductive molecule 19 is then arranged, and this operation is repeated, whereby a film is formed (please refer to the description given hereinbefore with respect to this film-forming process).

As apparent from the foregoing description, the nonlinear optical material of the present invention exerts a much larger nonlinear optical effect than the conventional materials. Accordingly, if the material of the present invention is applied to an electro-optical element or an optical-to-optical element, the device characteristics can be improved.

In the nonlinear optical material of the present invention, by the electron-donative and electron-acceptive effects (donor and acceptor effects) of the respective blocks, the light absorption band tends to prominently shift to the low-energy side. This means that when light of a long wavelength band is used, the resonant effect becomes conspicuous and the nonlinear effect is enhanced.

Still further, the inventor found that in an organic nonlinear optical material comprising a compound having in the molecule a conjugate main chain onto which donor groups D and acceptor groups A are added, in which at least two carbon atoms of the main chain are interposed between the carbon atom of the main chain to which the donor group is added and the carbon atom of the main chain to which the acceptor group is added, large quadratic and cubic nonlinear optical effects can be attained and simultaneously, the film-forming property and crystallinity can be improved by adjusting the length of the main chain in this organic nonlinear material.

Also this organic nonlinear optical material of the present invention can take various forms, such as an organic nonlinear optical film, an organic nonlinear optical dispersion and a side chain type polymer, as pointed out hereinbefore, and they can be prepared according to the above-mentioned procedures, especially by using the apparatus shown in FIG. 3. The conjugate main chain-containing compound constituting this optical material of the present invention is a long-chain conjugate molecule or conjugate polymer as described hereinbefore. In general, polydiacetylene is preferably used.

In the long-chain conjugate molecule or conjugate polymer, the donor groups D and acceptor groups A are arranged on the conjugate main chain in an optional sequence, but preferably, the donor groups D and acceptor groups A are alternately added. Optional groups selected from the groups evaluated to be valuable in the art can be used as the donor group D and acceptor group A to be added to the conjugate main chain. Preferred examples are shown in Table 1 given hereinbefore.

Preferably, the organic nonlinear optical material of the present invention has an inversion symmetry. Moreover, the organic nonlinear optical material of the present invention, as well as the above-mentioned nonlinear optical materials, can have a quantum well structure, a super lattice structure or an exciton-binding center, though the feature is not specifically described here.

The organic nonlinear optical material of the present invention is characterized in that groups (hereinafter referred to as "additional groups R") other than the donor groups D and acceptor groups A are added onto the main chain. The additional groups R include various groups. Typically, there can be mentioned (1) groups soluble in a solution, (2) groups promoting crystallization of a good quality, and (3) groups suitable for volatilizing the monomer and forming a vacuum deposition film. Specific examples of such additional groups are as follows:

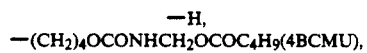
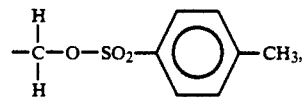
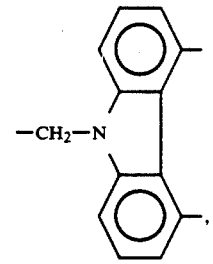
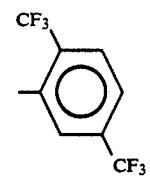
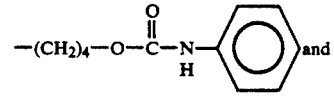
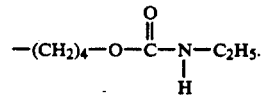

It should be understood that these additional groups R can be substituted with hydrogen atoms (H) according to need, as in the foregoing embodiments.

Figure 33A:
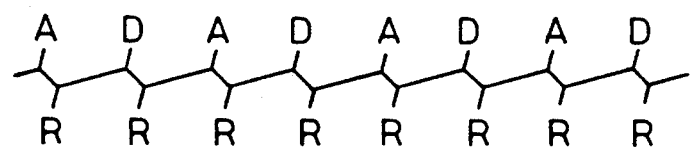
FIGS. 33A through 33C are diagrams illustrating structures of organic nonlinear optical materials.
Figure 33B:
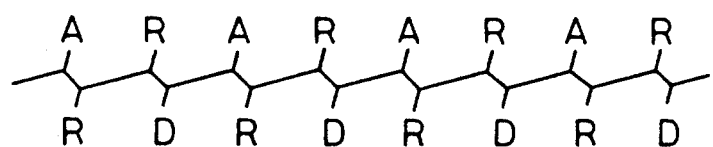
Figure 33C:
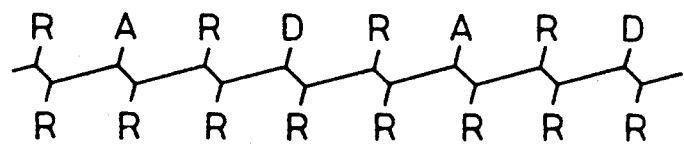

FIGS. 33A through 33C illustrate the organic nonlinear optical material with reference to polydiacetylene as an example.

FIG. 33A shows an embodiment in which the donor groups D and acceptor groups A are equidistantly arranged. This material can be formed by polymerizing two kinds of diacetylene monomers, R—C≡C—C≡C—A and R—C≡C—C≡C—D. The polymerization can be accomplished by the organic MBE process or the gas-phase growth process, as described hereinbefore.

FIG. 33B shows an embodiment in which the donor groups D and acceptor groups A are arranged alternately, but not equidistantly. This material can be prepared by stacking two kinds of diacetylene monomers, A—C≡C—C≡C—D and R—C≡C—C≡C—R, alternately.

FIG. 33C shows a modification of the embodiment shown in FIG. 33A, and this optical material can be formed by using a third diacetylene monomer R—C≡C—C≡C—R in addition to the two kinds of the diacetylene monomers, R—C≡C—C≡C—A and R—C≡C—C≡C—D, and stacking these three kinds of the monomers alternately.

In these organic nonlinear optical materials, by the transfer of the charge between the donor group D and acceptor group A, the energy gap is narrowed, and a super lattice quantum well can be formed. Moreover, by optimalizing the lengths of the regions to which the donor groups and acceptor groups are added, a nonlinear optical effect more than 10 times as high as that of LiNbO$_3$ can be attained. Still further, by utilizing the properties of the additional groups R, that is, by appropriately controlling the form of addition of groups promoting the crystallinity, film-forming property and solubility of the conjugate main chain, the crystallinity, film-forming property and solubility of the material can be prominently improved.

I claim:

1. An organic nonlinear optical material comprising a compound having a conjugate main chain in the molecule and having donor groups D and acceptor groups A attached to the conjugate main chain in the sequence of ..., D, D, A, A, D, D, ..., in which the distance between adjacent D's and the distance between adjacent A's are shorter than the distance between adjacent D and A with respect to the distance between the atoms on the main chain to which the respective groups are bonded.

2. An organic nonlinear optical material as set forth in claim 1, wherein the compound is a long-chain conjugate molecule.

3. An organic nonlinear optical material as set forth in claim 1, wherein the compound is a conjugate polymer.

4. An organic nonlinear optical material as set forth in claim 1, which is in the form of an organic nonlinear optical film.

5. An organic nonlinear optical material as set forth in claim 4, wherein the compound is a conjugate polymer and the film is formed by depositing a monomer capable of forming the conjugate polymer on a substrate and polymerizing the monomer by irradiation with light.

6. An organic nonlinear optical material as set forth in claim 1, which is in the form of an organic nonlinear optical dispersion of the organic nonlinear optical material in a medium.

7. An organic nonlinear optical material as set forth in claim 6, wherein the dispersion is prepared by depositing a gaseous organic molecule capable of forming said compound and a gaseous molecule capable of forming said medium simultaneously onto a substrate.

8. An organic nonlinear optical material comprising a compound having in the molecule a conjugate main chain, at a part of which a quantum well is formed, and having donor groups D and acceptor groups A added onto the conjugate main chain at the portion of the quantum well in the sequence of ..., D, D, A, A, D, D, ..., in which the distance between adjacent D's and the distance between adjacent A's are shorter than the distance between adjacent D and A with respect to the distance between the atoms on the main chain to which the respective groups are bonded.

9. An organic nonlinear optical material as set forth in claim 8, wherein the compound is a long-chain conjugate molecule.

10. An organic nonlinear optical material as set forth in claim 8, wherein the compound is a conjugate polymer.

11. An organic nonlinear optical material as set forth in claim 8, which is in the form of an organic nonlinear optical film.

12. An organic nonlinear optical material as set forth in claim 11, wherein the compound is a conjugate polymer and the film is formed by depositing a monomer capable of forming the conjugate polymer on a substrate and polymerizing the monomer by irradiation with light.

13. An organic nonlinear optical material as set forth in claim 8, which is in the form of an organic nonlinear optical dispersion of the organic nonlinear optical material in a medium.

14. An organic nonlinear optical material as set forth in claim 13, wherein the dispersion is prepared by depositing a gaseous organic molecule capable of forming said compound and a gaseous molecule capable of forming said medium simultaneously onto a substrate.

15. An organic nonlinear optical material comprising a compound having in the molecule a conjugate main chain and formed therein an exciton-binding center, and having donor groups D and acceptor groups A added on the conjugate main chain at the portion of the biding center in the sequence of ..., D, D, A, A, D, A, ..., in which the distance between adjacent D's and the distance between adjacent A's are shorter than the distance between adjacent D and A with respect to the distance between the atoms on the main chain to which the respective groups are bonded.

16. An organic nonlinear optical material as set forth in claim 15, wherein the compound is a long-chain conjugate molecule.

17. An organic nonlinear optical material as set forth in claim 15, wherein the compound is a conjugate polymer.

18. An organic nonlinear optical material as set forth in claim 15, which is in the form of an organic nonlinear optical film.

19. An organic nonlinear optical material as set forth in claim 18, wherein the compound is a conjugate polymer and the film is formed by depositing a monomer capable of forming the conjugate polymer on a substrate and polymerizing the monomer by irradiation with light.

20. An organic nonlinear optical material as set forth in claim 15, which is in the form of an organic nonlinear optical dispersion of the organic nonlinear optical material in a medium.

21. An organic nonlinear optical material as set forth in claim 20, wherein the dispersion is prepared by depositing a gaseous organic molecule capable of forming said compound and a gaseous molecule capable of forming said medium simultaneously onto a substrate.

22. A process for preparing an organic nonlinear optical film composed of a long-chain molecule or polymer having a conjugate main chain in the molecule, which comprises depositing a molecule or monomer capable of forming said long-chain molecule or polymer on a substrate to form a film, wherein a molecule or monomer having a three-dimensionally expanded steric-hindrance type group and/or a one-dimensionally or two-dimensionally expanded non-steric-hindrance type group, added into the structure thereof, is used as said molecule or monomer.

23. A process according to claim 22, wherein a molecule or monomer having an n-type group and/or a p-type group added into the structure thereof is used as said molecule or monomer.

24. An organic nonlinear optical material comprising a long-chain conjugate molecule or polymer having a conjugate main chain in the molecule, wherein at least two quantum wells are formed on the conjugate main chain.

25. An organic nonlinear optical material wherein long-chain conjugate molecules or polymers having a conjugate main chain are connected through another molecule different from the molecules or polymers in the energy gap.

26. An organic nonlinear optical material having in the molecule a conjugate main chain onto which a plurality of donor groups and acceptor groups are added, wherein the donor groups and acceptor groups are added in units of blocks.

27. An organic nonlinear optical material as set forth in claim 26, which comprises a neutral block free of the donor group and acceptor group in addition to a donor block consisting of a plurality of donor groups added onto the conjugate main chain and an acceptor block consisting of a plurality of acceptor groups added onto the conjugate main chain.

28. An organic nonlinear optical material comprising a compound having in the molecule a conjugate main chain onto which a donor group D and an acceptor group A are added, wherein at least two carbon atoms of the main chain are interposed between the carbon group of the main chain to which the donor group is added and the carbon atom of the main chain to which the acceptor group is added.

29. An organic nonlinear optical material as set forth in claim 28, wherein the compound is a long-chain conjugate molecule.

30. An organic nonlinear optical material as set forth in claim 28, wherein the compound is a conjugate polymer.

31. An organic nonlinear optical material as set forth in claim 28, which is in the form of an organic nonlinear optical film.

32. An organic nonlinear optical material as set forth in claim 31, wherein the compound is a conjugate polymer and the film is formed by depositing a monomer capable of forming the conjugate polymer on a substrate and polymerizing the monomer by irradiation with light.

33. An organic nonlinear optical material as set forth in claim 28, wherein groups other than the donor groups and acceptor groups, added to carbon atoms in the main chain, are selected from the class consisting of groups soluble in solutions, groups promoting the crystallization and groups capable of volatilizing monomers.

* * * * *